US010285166B2

(12) United States Patent
Han et al.

(10) Patent No.: US 10,285,166 B2
(45) Date of Patent: *May 7, 2019

(54) TRANSMISSION/RECEPTION METHOD AND APPARATUS FOR UPLINK MIMO RETRANSMISSION IN LTE SYSTEM

(71) Applicant: Samsung Electronics Co., Ltd., Gyeonggi-do (KR)

(72) Inventors: Jin-Kyu Han, Seoul (KR); Youn Sun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 52 days.

This patent is subject to a terminal disclaimer.

(21) Appl. No.: 15/342,749

(22) Filed: Nov. 3, 2016

(65) Prior Publication Data

US 2017/0078051 A1    Mar. 16, 2017

Related U.S. Application Data

(63) Continuation of application No. 14/245,585, filed on Apr. 4, 2014, now Pat. No. 9,648,597, which is a (Continued)

(30) Foreign Application Priority Data

Sep. 29, 2010    (KR) ..................... 10-2010-0094749

(51) Int. Cl.
*H04L 1/18*    (2006.01)
*H04W 72/04*    (2009.01)
(Continued)

(52) U.S. Cl.
CPC ...... *H04W 72/0413* (2013.01); *H04B 7/0456* (2013.01); *H04L 1/06* (2013.01);
(Continued)

(58) Field of Classification Search
None
See application file for complete search history.

(56) References Cited

U.S. PATENT DOCUMENTS 8,335,278 B2    12/2012    Lim et al.
8,811,301 B2    8/2014    Kim et al.
(Continued)

FOREIGN PATENT DOCUMENTS

JP    2014-241597    12/2014
KR    1020080110175    12/2008
(Continued)

OTHER PUBLICATIONS

Samsung, "UL SU-MIMO Precoding in PHICH-triggered Retransmissions", 3GPP TSG RAN WG1 #61, R1-103035, 3rd Generation Partnership Project, May 4, 2010.
(Continued)

*Primary Examiner* — Mujtaba M Chaudry
(74) *Attorney, Agent, or Firm* — The Farrell Law Firm, P.C.

(57) ABSTRACT

A method by a terminal, method by a base station, a terminal, and a base station are provided. The method by the terminal includes transmitting two transport blocks; and if one of the two transport blocks is negatively acknowledged (NACKed) and a physical downlink control channel (PDCCH) including control information is not detected, adjusting retransmission for the NACKed transport block using a precoding index 0 and a number of layers corresponding to the NACKed transport block.

16 Claims, 12 Drawing Sheets

Related U.S. Application Data continuation of application No. 13/248,617, filed on Sep. 29, 2011, now Pat. No. 9,237,561.

(51) Int. Cl.
   *H04B 7/0456* (2017.01)
   *H04W 28/04* (2009.01)
   *H04L 1/06* (2006.01)
   *H04L 1/16* (2006.01)
   *H04L 5/00* (2006.01)
   *H04L 1/08* (2006.01)

(52) U.S. Cl.
   CPC .............. *H04L 1/08* (2013.01); *H04L 1/1607* (2013.01); *H04L 1/1671* (2013.01); *H04L 1/1812* (2013.01); *H04L 1/1819* (2013.01); *H04L 1/1893* (2013.01); *H04L 1/1896* (2013.01); *H04L 5/0048* (2013.01); *H04W 28/04* (2013.01); *H04L 1/1825* (2013.01); *H04L 1/1864* (2013.01); *H04W 72/04* (2013.01)

(56) References Cited

U.S. PATENT DOCUMENTS

| | | | |
|---|---|---|---|
| 9,025,547 B2 | 5/2015 | Ko et al. | |
| 9,319,176 B2 | 4/2016 | Kim et al. | |
| 2006/0171347 A1* | 8/2006 | Attar | H04W 72/1263 370/328 |
| 2007/0250638 A1* | 10/2007 | Kiran | H04L 1/0006 709/236 |
| 2009/0010198 A1* | 1/2009 | Boariu | H04L 1/1854 370/315 |
| 2009/0073904 A1 | 3/2009 | Ranta-aho et al. | |
| 2009/0110114 A1* | 4/2009 | Onggosanusi | H04B 7/0417 375/299 |
| 2009/0307559 A1* | 12/2009 | Wu | H04L 1/1812 714/749 |
| 2010/0031117 A1 | 2/2010 | Lee et al. | |
| 2010/0034312 A1* | 2/2010 | Muharemovic | H04L 27/2613 375/267 |
| 2010/0111206 A1 | 5/2010 | Wu | |
| 2010/0131813 A1* | 5/2010 | Kim | H04L 1/0618 714/748 |
| 2010/0195759 A1* | 8/2010 | Gaal | H04B 7/0617 375/295 |
| 2010/0238886 A1 | 9/2010 | Sambhwani et al. | |
| 2011/0235586 A1 | 9/2011 | Han et al. | |
| 2013/0028213 A1 | 1/2013 | Ko | |
| 2013/0094349 A1 | 4/2013 | Hoshino et al. | |
| 2013/0094468 A1 | 4/2013 | Ko | |
| 2015/0326353 A1 | 11/2015 | Ko et al. | |

FOREIGN PATENT DOCUMENTS

| | | |
|---|---|---|
| KR | 1020100048865 | 5/2010 |
| KR | 1020100050384 | 5/2010 |
| RU | 2008120021 | 11/2009 |
| WO | WO 2011/122829 | 10/2011 |
| WO | WO 2011/122832 | 10/2011 |
| WO | WO 2011/161946 | 12/2011 |

OTHER PUBLICATIONS

Huawei, "Uplink re-transmission without UL Grant", R1-104298, 3GPP TSG RAN WG1 Meeting #62, Aug. 23-27, 2010, 5 pages.
LG Electronics, "Precoding for UL SU-MIMO in PHICH-triggered Retransmission", R1-104772, 3GPP TSG RAN WG1 Meeting #62, Aug. 23-28, 2010, 4 pages.
Samsung, "Further Issues in PHICH-triggered PUSCH Retransmissions", R1-105394, 3GPP TSG RAN WG1 #62bis, Oct. 11-15, 2010, 4 pages.
Japanese Office Action dated Sep. 26, 2016 issued in counterpart application No. 2015-216747, 6 pages.
Russian Office Action dated May 18, 2015 issued in counterpart application No. 2013113949/07.
Japanese Office Action dated Aug. 3, 2015 issued in counterpart application No. 2013-531493.
Australian Examination Report dated Nov. 4, 2015 issued in counterpart application No. 2011308211, 3 pages.
Korean Office Action dated Dec. 8, 2016 issued in counterpart application No. 10-2010-0094749, 4 pages.
Japanese Office Action dated Jan. 5, 2018 issued in counterpart application No. 2016-209389, 7 pages.
Texas Instruments, "Specifying Basic Building Blocks of UL Multi-Antenna Transmission", R1-102828, 3GPP TSG RAN WG1 61, May 10-14, 2010, 8 pages.
3rd Generation Partnership Project; Technical Specification Group Radio Access Network; Evolved Universal Terrestrial Radio Access (E-UTRA); Physical Channels and Modulation (Release 9), 3GPP TS 36.211 V9.1.0, Mar. 2010, 6 pages.
European Search Report dated Dec. 14, 2018 issued in counterpart application No. 11183030.3-1220, 9 pages.

* cited by examiner

TRANSMISSION/RECEPTION METHOD AND APPARATUS FOR UPLINK MIMO RETRANSMISSION IN LTE SYSTEM

PRIORITY

This application is a Continuation Application of U.S. patent application Ser. No. 14/245,585, filed in the United States Patent and Trademark Office on Apr. 4, 2014, which claims priority under 35 U.S.C. § 120 to U.S. patent application Ser. No. 13/248,617, filed in the United States Patent and Trademark Office on Sep. 29, 2011, and is now U.S. Pat. No. 9,237,561 issued on Jan. 12, 2016, which claims priority under 35 U.S.C. § 119(a) to a Korean Patent Application filed in the Korean Intellectual Property Office on Sep. 29, 2010, and assigned Serial No. 10-2010-0094749, the content of each of which are incorporated herein by reference.

BACKGROUND OF THE INVENTION

1. Field of the Invention

The present invention relates generally to a signaling method for use of Multiple Input and Multiple Out (MIMO) in Uplink (UL) of Long Term Evolution (LTE) system and, more particularly, to a method for determining a precoding matrix without a separate control signal.

2. Description of the Related Art

Mobile communication systems have evolved into high-speed, high-quality wireless packet data communication systems that provide data services and multimedia services that far exceed early voice-oriented services. Recently, various mobile communication standards have been developed to support services of the high-speed, high-quality wireless packet data communication systems. These standards include, for example, High Speed Downlink Packet Access (HSDPA) and High Speed Uplink Packet Access (HSUPA), both defined in $3^{rd}$ Generation Partnership Project (3GPP), High Rate Packet Data (HRPD) defined in $3^{rd}$ Generation Partnership Project-2 (3GPP2), and 802.16 defined by the Institute of Electrical and Electronics Engineers (IEEE).

The recent mobile communication systems use specific technologies, such as an Adaptive Modulation and Coding (AMC) method and a Channel-Sensitive Scheduling (CSS) method, to improve the transmission efficiency. Through the use of the AMC method, a transmitter can adjust an amount of transmission data according to a channel state. Specifically, when the channel state is bad, the transmitter reduces the amount of transmission data to adjust a reception error probability to a desired level. When the channel state is good, the transmitter increases the amount of transmission data to adjust the reception error probability to the desired level, thereby efficiently transmitting a large volume of information. Through the use of a CSS-based resource management method, the transmitter selectively services a user having a channel state that is better than those of other users. This selective servicing provides an increase in the system capacity when compared to a method of allocating a channel to one user and servicing the user with the allocated channel. Such a capacity increase is referred to as 'multi-user diversity gain'. Thus, the AMC method and the CSS method each apply an appropriate modulation and coding scheme at the most-efficient time, which is determined based on partial channel state information that is fed back from a receiver.

Research has been conducted in order to replace Code Division Multiple Access (CDMA), the multiple access scheme used in the $2^{nd}$ and $3^{rd}$ generation mobile communication systems, with Orthogonal Frequency Division Multiple Access (OFDMA) in the next generation system. The standardization organizations, such as 3GPP, 3GPP2, and IEEE, have begun standardizations of evolved systems employing OFDMA. The OFDMA scheme results in a capacity increase when compared to the CDMA scheme. One reason for the capacity increase in the OFDMA scheme is that the OFDMA scheme can perform scheduling in the frequency domain (frequency domain scheduling). While the transceiver acquires capacity gain according to a time-varying channel characteristic using the CSS method, the transceiver can obtain a higher capacity gain through the use of a frequency-varying channel characteristic.

In LTE, Orthogonal Frequency Division Multiplexing (OFDM) has been adopted for Downlink (DL) transmissions and Single Carrier Frequency Division Multiple Access (SC-FDMA) has been adopted for Uplink (UL) transmissions. Both transmission schemes are characterized by scheduling on frequency axis.

AMC and CSS are techniques that are capable of improving transmission efficiency when the transmitter has enough information on the transmit channel. In the LTE DL, the base station cannot estimate the DL channel state using the UL receive channel in a Frequency Division Duplex (FDD) mode such that the UE reports the information on the DL channel. However, the DL channel report sent from the UE to the base station can be omitted in a Time Division Duplex (TDD) mode in which the DL transmit channel state is estimated through the UL receive channel. Meanwhile, in the LTE UL, the UE transmits a Sounding Reference Signal (SRS) such that the base station estimates the UL channel using the received SRS.

In the LTE DL, the multiple antenna transmission technique, i.e., MIMO, is supported. The evolved Node B (eNB) of the LTE system can be implemented with one, two or four transmit antennas, and thus, can achieve beamforming gain and spatial multiplex gain by adopting precoding with multiple transmit antennas.

Recently, UL MIMO for LTE has been discussed. In DL MIMO, the eNB, as the transmitter, determines the transmission properties, such as, for example, modulation and coding, MIMO, and precoding schemes. The eNB can configure and transmit a Physical Downlink Shared CHannel (PDSCH) and inform the UE of the transmission property applied to the PDSCH. In UL MIMO, the eNB, as the receiver, determines the transmission properties, such as, for example, modulation and coding, MIMO, and precoding schemes, according to the channel characteristics of each UE. The eNB notifies the UE of the transmission properties through a Physical Downlink Control CHannel (PDCCH). The UE configures and transmits a Physical Uplink Shared CHannel (PUSCH) by reflecting the transmission properties transmitted by the eNB. Specifically, the eNB always makes a decision on the AMC, CSS, and MIMO precoding, and the UE receives the PDSCH and transmits the PUSCH according to the decision made by the eNB.

If the eNB knows the exact channel state, it is possible to determine the amount of data that is most appropriate for the channel state using AMC. However, there is a difference between the channel state known to the eNB and the actual channel state in the real environment due to estimation and feedback errors. Accordingly, it is impossible to avoid errors in actual transmission/reception, even when AMC is applied.

In order to retransmit a signal that failed in its initial transmission, Hybrid Automatic ReQuest (HARQ) is adopted. In HARQ, the receiver sends the transmitter a negative acknowledgement (NACK) indicating a decoding failure on the received data and an acknowledgement (ACK) indicating successful decoding on the received data, such that the transmitter can retransmit the lost data.

In a system using HARQ, the receiver combines the retransmitted signal and the previously received signal to improve the reception performance. The data signal that was previously received and failed in decoding is saved in a memory in consideration of retransmission. The HARQ process is configured such that the transmitter can transmit additional data during the time the ACK or NACK is transmitted by the receiver and the receiver can determine one of the previously received signals to be combined with a retransmission signal based on the HARQ Process IDentifier (HARQ PID). The HARQ can be categorized into one of synchronous HARQ and asynchronous HARQ, depending on whether the HARQ PID is notified by a control signal. In the synchronous HARQ, the HARQ PID is provided in the functional relationship of the subframe sequence number carrying the PDCCH rather than through a control signal. The subframe is a unit of resource allocation on a time axis. In the asynchronous HARQ, the HARQ PID is provided by mans of the control signal. The LIE system employs the asynchronous HARQ for DL and the synchronous HARQ for UL.

FIG. 1 is a diagram illustrating a conventional UL synchronous HARQ process.

Referring to FIG. 1, the eNB sends an UL grant in PDCCH in an $n^{th}$ subframe, as shown block 101. The HARQ PID is determined by the subframe sequence n. For example, if the HARQ PID corresponding to the subframe sequence number n is 0, the HARQ PID corresponding to the subframe sequence number n+1 becomes 1. The PDCCH carrying the UL grant in the $n^{th}$ subframe includes a New Data Indicator (NDI). If the NDI is toggled from its previous value, the UL grant is an assignment of PUSCH for a new data transmission. If the NDI is maintained, the UL grant is an assignment of PUSCH for retransmission of previously transmitted data. Assuming that the UL grant of PDCCH 101 is transmitted with the toggled NDI, the UE performs initial transmission of PUSCH carrying new data in an $(n+4)^{th}$ subframe, as shown in block 103. The UE can be aware of whether the PUSCH data transmitted in the $(n+4)^{th}$ subframe has been successfully decoded through a Physical HARQ Indicator CHannel (PHICH) transmitted by the eNB in an $(n+8)^{th}$ subframe, as shown in block 105. If the PHICH carries a NACK, the UE performs PUSCH retransmission in an $(n+12)^{th}$ subframe, as shown in block 107.

As described above, in the synchronous HARQ, the initial transmission and retransmission of a Transport Block (TB) are performed in association with a sequence number of the subframe. Since the eNB and UE know the TB that was initially transmitted in the $(n+4)^{th}$ subframe is retransmitted in $(n+12)^{th}$ subframe, it is possible to perform the HARQ process without the use of a separate HARQ PID. However, since the transmission interval of the same TB is 8 subframes, the number of HARQ processes that can be simultaneously active is limited to 8.

In the UL synchronous HARQ process of FIG. 1, the retransmission is triggered by the PHICH, which indicates only the HARQ ACK or NACK. If it is necessary for the eNB to change the PUSCH transmission property, such as the transmission resource and modulation and coding scheme, for retransmission, it can be allowed to transmit in PDCCH indicating this change. This HARQ scheme allowing for the change of the transmission property is referred to as adaptive synchronous HARQ.

FIG. 2 is a diagram illustrating a conventional UL adaptive synchronous HARQ process.

Referring to FIG. 2, the eNB notifies the UE of a decoding failure of the PUSCH 103 in the $(n+4)^{th}$ subframe by transmitting a NACK in PHICH in the $(n+8)^{th}$ subframe, as shown in block 105. At this time, PDCCH is simultaneously transmitted with PHICH 105 in order to change the transmission property, as shown in block 106. Since PDCCH decoding is attempted in every subframe, the UE can receive the PDCCH 106 for the transmission property change. The UE performs PUSCH retransmission in the $(n+12)^{th}$ subframe based on the transmission property indicated by the PDCCH, in block 108.

In the adaptive synchronous HARQ, even when the amount of DL control information for retransmission increases to an amount that causes overhead, the eNB can transmit PHICH with PDCCH for changing the transmission property or without PDCCH for maintaining the transmission property to minimize the amount of DL control information for the HARQ operation.

FIG. 3 is a flowchart illustrating operations of the eNB for the conventional UL adaptive synchronization HARQ procedure.

Referring to FIG. 3, the eNB performs UL scheduling to allocate a resource for PUSCH transmission to the UE with the UL grant, in step 131. The eNB transmits PDCCH to grant an initial PUSCH transmission to the scheduled UE, in step 133. The eNB receives and decodes PUSCH in the fourth subframe after the subframe where the PDCCH is transmitted, in step 135. The eNB determines whether the PUSCH decoding is successful, in step 137. If the PUSCH is decoded successfully, the eNB sends the UE an ACK, in step 139, and methodology returns to step 131 for new scheduling. If the PUSCH decoding fails in step 137, the eNB sends the UE a NACK, in step 141. According to the adaptive synchronous HARQ operation, the eNB determines whether it is necessary to change the transmission property as compared to that of the initial transmission, in step 143. If it is not necessary to change the transmission property, the methodology returns to step 135 to receive and decode the retransmitted PUSCH. If it is necessary to change the transmission property, the eNB transmits PDCCH to grant PUSCH retransmission having the new transmission property to the UE, in step 145. After transmitting the NACK to request for retransmission, the methodology returns to step 135 to receive and decode the retransmitted PUSCH.

FIG. 4 is a flowchart illustrating operations of the UE for the conventional UL adaptive HARQ procedure.

Referring to FIG. 4, the UE receives and decodes the PDCCH for UL grant, in step 151, and determines whether the PDCCH is decoded successfully, in step 153. If the PDCCH for UL grant is decoded successfully, the UE determines whether the NDI is toggled, in step 155. If NDI is toggled, it indicates that the UL grant is for an initial transmission of a new TB. Thus, the UE transmits a PUSCH carrying the new TB, in step 157. If NDI is not toggled, this indicates that a previous TB having a same HARQ PID was not decoded successfully, and the UE retransmits the PUSCH carrying the previous TB with a transmission property according to an indication of the PDCCH, in step 159.

If the PDCCH for UL grant is not decoded successfully at step 153, the UE receives and decodes a PHICH, in step 161. Upon receipt of the PHICH, the UE determines whether the PHICH carries an ACK, in step 163. If the PHICH carries the ACK, the UE stops transmitting the PUSCH, in step 165. If the PHICH carries NACK, the UE transmits the PUSCH carrying the previous TB with the transmission property indicated by a most recently received PDCCH, in step 167. However, the Redundancy Version (RV) of the PUSCH, which is retransmitted in PHICH, increases automatically without separate instruction.

There are two main schemes for HARQ retransmission: Chase Combining (CB) and Incremental Redundancy (IR). CB is a method that combines an initial transmission and its subsequent retransmission at the symbol level in the receiver. IR is a method for combining an initial transmission and its retransmission having different RVs in the decoding process of the receiver. In spite of its high complexity as compared to CB, the IR is widely used for HARQ retransmission due to the additional decoding gain. Since the PDCCH for changing the RV in the synchronous HARQ is not transmitted, the RV is determined implicitly. In the LTE system, a total of 4 RVs are defined (RV=0, 1, 2, 3). In case of the synchronous HARQ, the RV is applied in order of {0, 1, 2, 3}, according to the transmission order.

The Downlink Control Information (DCI) for UL grant for the PUSCH transmission includes the following Information Elements (IE):

- A flag for differentiating between DCI format 0 and DCI format 1A: Because DCI format 0 for UL grant and DCI format 1A for compact DL assignment are always forced to be the same size in LTE, there is a need to differentiate between format 0 and format 1A.
- Frequency hopping flag: This flag is an IE used to notify of the use of frequency hopping for frequency diversity in PUSCH transmission.
- Resource assignment information: This IE is defined for indicating the resource assigned for PUSCH transmission.
- Modulation and Coding scheme: This is an IE that indicates the modulation and coding scheme for use in PUSCH transmission. Some code points of this IE are defined to indicate the RV for retransmission.
- NDI: This is an IE indicating whether the corresponding grant is an initial transmission of a new TB or a retransmission. If its value is toggled, it indicates a grant for a new TB transmission and, otherwise, it indicates a grant for retransmission.
- Transmit Power Control: This is an IE indicating the transmit power for use in PUSCH transmission.
- RS parameter Cyclic Shift Index (CSI): The RS for PUSCH demodulation is defined with a Zadoff-Chu (ZC) sequence. The ZC sequence has a characteristic in which the new ZA sequence is acquired by changing the cyclic shift. The IE indicating the cyclic shift of the RS for PUSCH demodulation is defined in the UL grant for multiuser MIMO. By assigning the RSs having different cyclic shift indices, the eNB can discriminate between the signals of different users based on the orthogonality of the RS.
- Channel Quality Indicator (CQI) request: This is an IE for requesting non-periodic CQI feedback on the PUSCH. This IE is 1 bit, and is set to 1 for transmission of non-periodic CQI, a Precoding Matrix Indicator (PMI), and a Rank Indicator (RI) along with data; and is set to 0 for data transmission only on the PUSCH.

Unlike the case where both of the two TBs are successfully decoded or not decoded, the eNB requesting UL MIMO transmission can define the precoding operation of the UE without transmission of PDCCH. If one of the two TBs is successfully decoded, it is necessary to transmit the PDCCH indicating the precoding scheme of the UE. This characteristic degrades the significant advantage of the synchronous HARQ. The synchronous HARQ can trigger retransmission only with PHICH, and without transmission of PDCCH. Unlike the PHICH carrying only the ACK/NACK information, PDCCH is designed to carry various control information such that the eNB consumes a relatively large amount of frequency resources and transmission power for PDCCH transmission. Specifically, one of the advantages of the synchronous HARQ is to minimize the frequency resource and transmission power consumption. Accordingly, the PDCCH transmission for retransmission grant causes an increase of resource consumption for the control signal.

SUMMARY OF THE INVENTION

The present invention has been made to address at least the above problems and/or disadvantages and to provide at least the advantages described below. Accordingly, an aspect of the present invention provides a method for controlling UL HARQ only with PHICH, especially when the retransmission of one TB is requested in the LTE system supporting UL MIMO.

In accordance with an aspect of the present invention, a method by a terminal is provided. The method includes transmitting two transport blocks; and if one of the two transport blocks is negatively acknowledged (NACKed) and a physical downlink control channel (PDCCH) including control information is not detected, adjusting retransmission for the NACKed transport block using a precoding index 0 and a number of layers corresponding to the NACKed transport block.

In accordance with another aspect of the present invention, a method by a base station is provided. The method includes receiving two transport blocks; and receiving retransmission for a NACKed transport block using a precoding index 0 and a number of layers corresponding to the NACKed transport block, if the base station transmits a NACK for one of the two transport blocks and does not transmit a PDCCH including control information.

In accordance with another aspect of the present invention, a terminal is provided. The terminal includes a transceiver configured to transmit and receive a signal; and a controller configured to transmit two transport blocks, and if one of the two transport blocks is NACKed and a PDCCH including control information is not detected, adjust retransmission for the NACKed transport block using a precoding index 0 and a number of layers corresponding to the NACKed transport block.

In accordance with another aspect of the present invention, a base station is provided. The base station includes a transceiver configured to transmit and receive a signal; and a controller configured to receive two transport blocks; and receive retransmission for a NACKed transport block using a precoding index 0 and a number of layers corresponding to the NACKed transport block, if the base station transmits a negative acknowledgment (NACK) for one of the two transport blocks and does not transmit a PDCCH including control information.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Various embodiments of the present invention are described in detail with reference to the accompanying drawings in detail. The same or similar components may be designated by the same or similar reference numbers although they are illustrated in different drawings. Detailed descriptions of constructions or processes known in the art may be omitted to avoid obscuring the subject matter of the present invention.

Although embodiments of the present invention are directed to the LTE system, the present invention is not limited thereto. For example, the present invention can be applied to any of the communication systems supporting UL MIMO.

Figure 5:
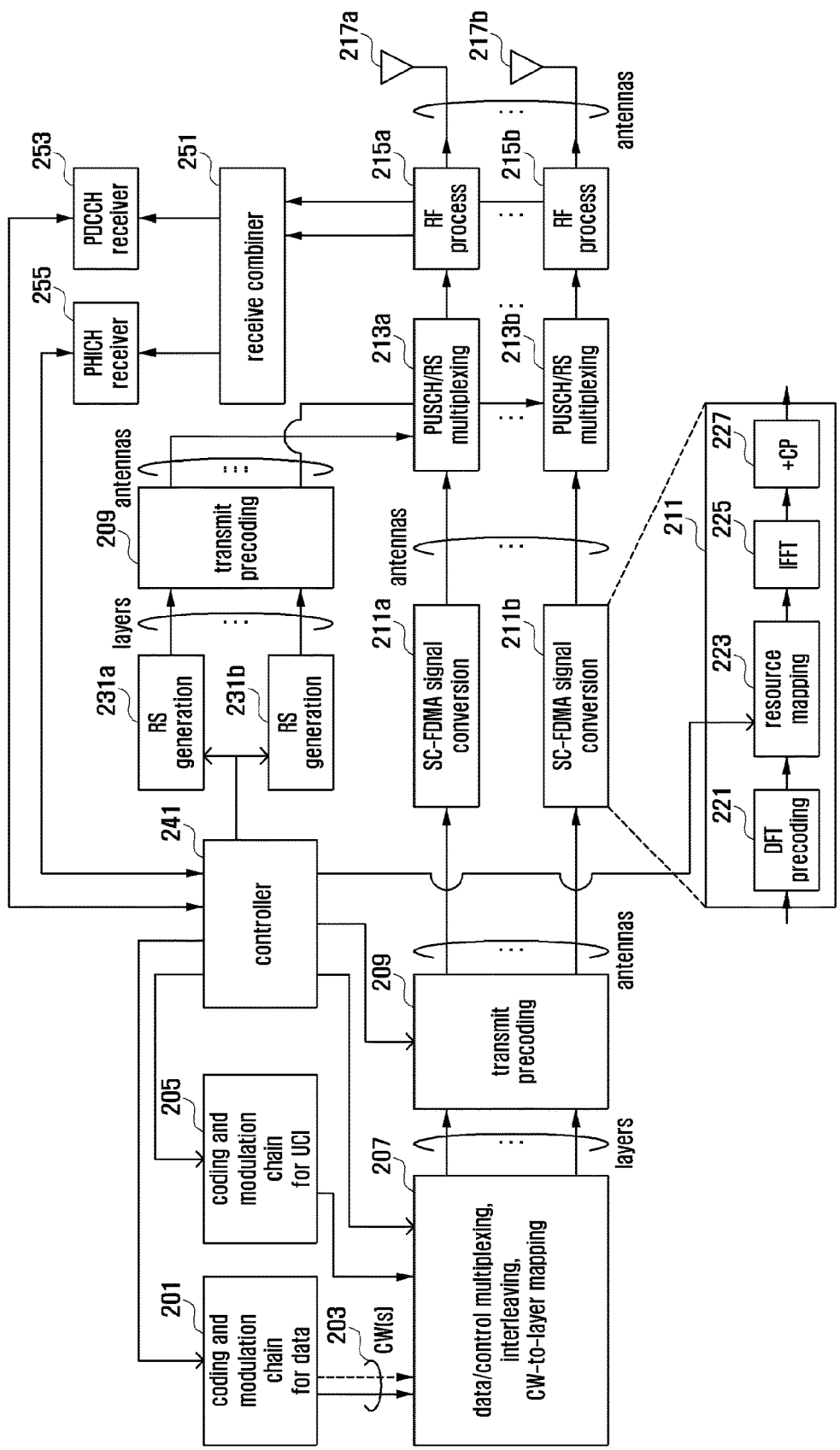
FIG. 5 is a block diagram illustrating a configuration of the UE for supporting the UL MIMO, according to an embodiment of the present invention.

FIG. 5 is a block diagram illustrating a configuration of the UE for supporting the UL MIMO, according to an embodiment of the present invention.

Referring to FIG. 5, the LTE system employs SC-FDMA in uplink. Typically, the Uplink Control Information (UCI), including UL ACK/NACK information for DL HARQ, CQI, PMI, and RI, is transmitted on a Physical Uplink Control Channel (PUCCH), and the UL data is transmitted on the PUSCH. In the transmitting the UCI and UL data to maintain the single carrier property, the UCI is multiplexed on the PUSCH along with the UL data rather than transmitted on the PUCCH. When the non-periodic CQI is requested with UL grant, the non-periodic CQI, PMI, and RI is transmitted with data on PUSCH such that the UCI and the data are multiplexed.

Function block 201 performs encoding and modulation to generate a data signal, and function block 205 performs decoding and modulation to generate a UCI signal. In the UE supporting UL MIMO, up to two codewords (hereinafter referred to as CW) are generated. Typically, the CW corresponds to the TB, i.e., CW0 is equal to TB1 and CW1 is equal to TB2. When the swap function is activated, the relationship between CW0 and TB1 can be changed such that CW0 corresponds to TB2 and CW1 to TB1. Although the swap function is defined in LTE DL MIMO, it may be unnecessary in UL MIMO.

The function block 201 applies different scrambling codes to generate the CW according to the CW sequence. In the LTE system, the scrambling sequence can be a length-31 gold sequence c(n), as shown in Equation (1) below:

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad (1)$$

In Equation (1),

Amod2 is a remainder obtained by dividing A by 2

$N_C=1600$

The initial value of $x_1(n)$ is $x_1(0)=1$, and $x_1(n)=0$ for n=1, 2, ..., 30

The initial value of $x_2(n)$ is expressed as Equation (2) below:

$$c_{init}=\Sigma_{i=0}^{30} x_2(i) \cdot 2^i = n_{RNTI} \cdot 2^{14} + q \cdot 2^{13} + \lfloor n_s/2 \rfloor \cdot 2^9 + N_{ID}^{cell} \quad (2)$$

In Equation (2), $n_{RNTI}$ is a Radio Network Temporary Identifier (RNTI) in association with PUSCH transmission q is a CW sequence, q=0 for CW0 and q=1 for CW1

$n_S$ is a sequence number of the first slot of a subframe carrying PUSCH, and $\lfloor n_s/2 \rfloor$ is a sequence number of the subframe carrying PUSCH $N_{ID}^{cell}$ is an identifier of the serving cell Among the signal lines denoted by reference number 203 in FIG. 5, the solid line arrow means the generation of single CW, and the dotted line arrow means the generation of two CWs. The modulated data signal generated by the function block 201 and the modulated UCI signal generated by the function block 205 are multiplexed, interleaved, and mapped to a MIMO layer by function block 207. In LTE, the CW is mapped to the MIMO layer as shown in Table 1 below.

TABLE 1

| # of layers (rank) | # of CW | CW-to-layer mapping |
|---|---|---|
| 1 | 1 | CW 0 → layer 0:<br>$x^{(0)}(i) = d^{(0)}(i)$ |
| 2 | 2 | CW 0 → layer 0 & CW 1 → layer 1:<br>$x^{(0)}(i) = d^{(0)}(i)$<br>$x^{(1)}(i) = d^{(1)}(i)$ |
| 2 | 1 | CW 0 → layers {0, 1}:<br>$x^{(0)}(i) = d^{(0)}(2i)$<br>$x^{(1)}(i) = d^{(0)}(2i + 1)$<br>only retransmission is allowed |
| 3 | 2 | CW 0 → layer 0 & CW 1 → layers {1, 2}:<br>$x^{(0)}(i) = d^{(0)}(i)$<br>$x^{(1)}(i) = d^{(1)}(2i)$<br>$x^{(2)}(i) = d^{(1)}(2i + 1)$ |
| 4 | 2 | CW 0 → layers {0, 1} & CW 1 → layers {2, 3}:<br>$x^{(0)}(i) = d^{(0)}(i)$<br>$x^{(1)}(i) = d^{(1)}(2i)$<br>$x^{(2)}(i) = d^{(1)}(2i + 1)$ |

In Table 1, $d^{(k)}(i)$ denotes an $i^{th}$ modulation symbol of CW k, and $x^{(l)}(i)$ denotes an $i^{th}$ symbol of an $l^{th}$ layer. When a CW is mapped to two layers, the even-numbered modulation symbol is mapped to the low layer, and the odd-numbered modulation symbol is mapped to the high layer. By mapping one CW to two layers, it is possible to transmit more modulation symbols so as to increase the transmission data amount or decrease the coding rate, as compared to mapping one CW to one layer.

As shown in Table 1, for a rank-1 transmission, the number of CWs is 1 for one layer and 2 for multiple layers. There is an exceptional case where one CW is transmitted in spite of rank-2 transmission and, in this case, only the retransmission is allowed.

The layer signals output by the function block 207 are precoded by function block 209. Precoding is per-layer beamforming that improves reception quality on each layer. The precoding is determined in consideration of the transmission channel property and, since the transmission channel of UL MIMO is the UL channel, the eNB instructs the UE to use an appropriate precoder according to the UL channel measurement result. The UE performs precoding according to an instruction from the eNB. The precoder is expressed as a matrix having a number of rows that corresponds to a number of antennas, and a number of columns that corresponds to a number of layers. Equation (3) shows the precoding matrix.

$$y = \begin{bmatrix} y^{(0)}(i) \\ \vdots \\ y^{(N-1)}(i) \end{bmatrix} = Px = \begin{bmatrix} p_{11} & \cdots & p_{R1} \\ \vdots & \ddots & \vdots \\ p_{N1} & \cdots & p_{RN} \end{bmatrix} \begin{bmatrix} x^{(0)}(i) \\ \vdots \\ x^{(R-1)}(i) \end{bmatrix} \quad (3)$$

In Equation (3), $x^{(n)}(i)$ denotes an $i^{th}$ symbol to be transmitted by an nth transmit antenna. In an embodiment of the present invention, the transmit antenna is a logical antenna for signal transmission rather than a physical antenna. The mapping between the logical antennas and the physical antennas can be defined diversely.

Table 2 shows precoding matrices for use in a situation using two transmit antennas for LTE UL MIMO, and Table 3 shows precoding matrices for use in a situation using four transmit antennas for LTE UL MIMO.

TABLE 2

| Rank-1 | Indices 0~3 | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |
|---|---|---|---|---|---|
| | Indices 4~5 | $\frac{1}{\sqrt{2}}\begin{bmatrix}1\\0\end{bmatrix}$ | $\frac{1}{\sqrt{2}}\begin{bmatrix}0\\1\end{bmatrix}$ | — | — |
| Rank-1 | Index 0 | $\frac{1}{\sqrt{2}}\begin{bmatrix}1 & 0\\0 & 1\end{bmatrix}$ | — | — | — |

TABLE 3

| Rank-1 | Indices 0~3 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
|---|---|---|---|---|---|
| | Indices 4~7 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| | Indices 8~11 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| | Indices 12~15 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| | Indices 15~19 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| | Indices 20~23 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

TABLE 3-continued

| | | | | | |
|---|---|---|---|---|---|
| Rank-2 | Indices 0~3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| | Indices 4~7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| | Indices 8~11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| | Indices 12~15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |
| Rank-3 | Indices 0~3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| | Indices 4~7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| | Indices 8~11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |
| Rank-4 | Index 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | — | — | — |

A signal output by the function block 209 to be transmitted through the transmit antenna. This signal is processed so as to be output in SC-FDMA signal format appropriate for LTE UL transmission. Function block 211a is the SC-FDMA signal convertor for the first transmit antenna, and function block 211b is the SC-FDMA signal converter for the second transmit antenna. The SC-FDMA signal converter includes a Discrete Fourier Transform (DFT) precoder 221, a resource mapper 223, an Inverse Fast Fourier Transformer (IFFT) 225, and a Cyclic Prefix (CP) adder 227.

A Reference Signal (RS) is the signal provided for coherent demodulation. The RS is generated per layer, and function blocks 231a and 232b are the RS generators. The function block 231a is the RS generator for the first layer, and the function block 231b is the RS generator for the last layer. The function block 209 performs precoding on the RSs of individual layers as applied to the PUSCH. Since the same precoding is applied to the RS and PUSCH, the eNB can receive the RS and estimates a channel for decoding per layer. Through the per-layer RS precoding, the RSs are generated for transmission through respective transmit antennas.

In the LTE system, the UL RS is defined with a ZC sequence. The ZC sequence is characterized in that both the time domain signal and the Fourier-transformed frequency domain signal are formed as a symbol having a predetermined size. The ZC sequences acquired by applying different cyclic shifts (CS) to a basic ZC sequence are orthogonal with each other. In the LTE system, 12 CSs are supported for UL RS. Multiple users can share the frequency-time resource for PUSCH transmission, and the UL multiuser MIMO is implemented by assigning the CSs derived from different ZC sequences to the respective users. The PDCCH for granting PUSCH transmission includes a 3-bit Cyclic Shift Index (CSI) for notifying the ZC sequence of the CS for UL RS. In order to reinforce the orthogonality of the RS, a length-2 Walsh code is applied to the RS transmitted in the two slots of the subframe carrying PUSCH on the time axis. This Walsh code is referred to as an Orthogonal Cover Code (OCC), and the CSI indicates one of [+1, +1] and [+1, −1] as the OCC.

For UL single user MIMO, multiple layers are configured for PUSCH transmission. Each layer uses a unique RS having orthogonality, and the CSI of PDCCH notifies of the CS and OCC for the first layer RS. The CS and OCC of the second or next layer RS is determined by the layer number by referencing the CS and OCC of the first layer RS. Specifically, if k is the layer number and if the CS and OCC of the $k^{th}$ layer RS are $CS_k$ and $OCC_k$, the CSI of PDCCH indicates only the $CS_1$ and $OCC_1$, such that the $CS_k$ and $OCC_k$ are determined in functions of $CS_1$ and k and $OCC_1$ and k. $CS_k$ and $OCC_k$ are described in detail with reference to Equation (4) below.

$$CS_k = (CS_1 + \Delta_k) \mod 12$$

$$OCC_k = (OCC_1 + \delta_k) \mod 2 \quad (4)$$

In Equation (4), $\Delta_k$ denotes a CS offset value for determining the $k_{th}$ layer CS, and $\delta_k$ denotes an OCC offset value for determining the $k_{th}$ layer OCC.

The $\Delta_k$ and $\delta_k$ for determining $S_k$ and $OCC_k$ are shown in Table 4.

TABLE 4

| Offset | k | | | |
|---|---|---|---|---|
| | 1 | 2 | 3 | 4 |
| $\Delta_k$ | 0 | 6 | 3 | 9 |
| $\delta_k$ | 0 | 0 | 1 | 1 |

The SC-FDMA signals of PUSCH to be transmitted by the respective transmit antennas are multiplexed with the corresponding RSs by function blocks 213a and 213b in FIG. 5. The function block 213a is a multiplexer for multiplexing PUSCH and RS to be transmitted by the first transmit antenna, and function block 213b is a multiplexer for multiplexing PUSCH and RS to be transmitted by the second transmit antenna. In order to maintain the single carrier property, the RS and PUSCH are multiplexed on the time domain (time division multiplexing) so as to be transmitted in different SC-FDMA symbols.

The baseband signals to be transmitted by the transmit antennas of the UE are converted to RF signals by RF processors 215a and 215b and then transmitted through transmit antennas 217a and 217b. The RF processors 215a and 215b process the signals to be transmitted through the first and last transmit antennas. 217a and 217b represent the first and last transmit antennas.

The reception part of the UE includes a receive combiner 251, a PDCCH receiver 253, and a PHICH receiver 255. The receive combiner 251 combines the signals received by multiple receive antennas. The combined signal is delivered to the PDCCH receiver 253 and the PHICH receiver 255. The PDCCH receiver 253 receives the control signal when the eNB has transmitted the DCI signal for adaptive HARQ, and the PHICH receiver 255 receives the control signal when the eNB has transmitted ACK/NACK signal on PHICH. The DCI signal of PDCCH and ACK/NACK signal of PHICH are delivered to a controller 241.

When two TBs are transmitted on the UL PUSCHs, the ACK/NACK state information per TB is transmitted to the eNB on PHICH. The resource for transmitting DL ACK/NACK information for UL PUSCH transmission is expressed as ($n_{PHICH}^{group}$, $n_{PHICH}^{seq}$). Here, $n_{PHICH}^{group}$ denotes the PHICH group number, and $n_{PHICH}^{seq}$ denotes the PHICH sequence number in the corresponding PHICH group. PHICH is the channel for transmitting one of the ACK and NACK using Binary Phase Shift Keying (BPSK) modulation scheme, and $2N_{SF}^{PHICH}$ ACK/NACK information are multiplexed into one PHICH group using a unique PHICH sequence. Before UL single user MIMO is introduced, only one PHICH is allocated per user but, with the introduction of the UL single user MIMO, it becomes necessary to assign two PHICHs to the user which has transmitted two TBs, as shown in Equation (5).

$$n_{PHICH}^{group} = (I_{PRB\_RA} + n_{DMRS}) \mod N_{PHICH}^{group} + I_{PHICH} N_{PHICH}^{group}$$
$$n_{PHICH}^{seq} = ([I_{PRB\_RA}/N_{PHICH}^{group}] + n_{DMRS}) \mod 2N_{SF}^{PHICH} \quad (5)$$

In Equation (5), $n_{DMRS}$ denotes the value determined by CSI of UL RS, CSI is indicated explicitly in PDCCH carrying the information on the UL PUSCH. $N_{SF}^{PHICH}$ denotes the spreading factor for use in modulation of PHICH, and a PHICH group includes $2N_{SF}^{PHICH}$ PHICHs. $N_{PHICH}^{group}$ denotes the total number of PHICH groups and is notified by the eNB in advance. $I_{PHICH}$ is set to 1 when a specific condition for increasing the size of the PHICH group is fulfilled, and 0 in all other cases. $I_{PRB\_RA}$ is a value determined by the Resource Block (RB) on the frequency axis, which is used for PUSCH transmission and indicated explicitly in PUSCH carrying the information on the UL PUSCH. The PHICH resource for transmitting ACK/NACK information on the first TB is determined by $I_{PRB\_RA} = I_{PRB\_RA}^{lowest\_index}$. The PHICH resource for transmitting ACK/NACK information on the second TB is determined by $I_{PRB\_RA} = I_{PRB\_RA}^{lowest\_index} + 1$. Here, $I_{PRB\_RA}^{lowest\_index}$ is the RB index having the least value among the RBs used for PUSCH transmission.

The controller 241 controls the PHICH receiver 255 to determine the PHICH resource for detecting ACK/NACK signal per TB and controls other function blocks to perform UL HARQ operations using the received ACK/NACK signal.

The controller 241 controls the overall operations of the UE so as to determine a frequency resource for PUSCH transmission, a modulation and coding scheme for the data and UCI transmitted on PUSCH, a resource amount to be allocated for UCI in the PUSCH resource, a rank of MIMO transmission, a precoding scheme, and a parameter for generating RS per transmit antenna and control function blocks of the resource arrangement 223, data and UCI encoding and modulation 201 and 205, data and UCI multiplex and interleaving and CW-layer mapping 207, precoding 209, and RS generation 231. The controller 241 controls the receipt of PDCCH and PHICH.

Figure 6:
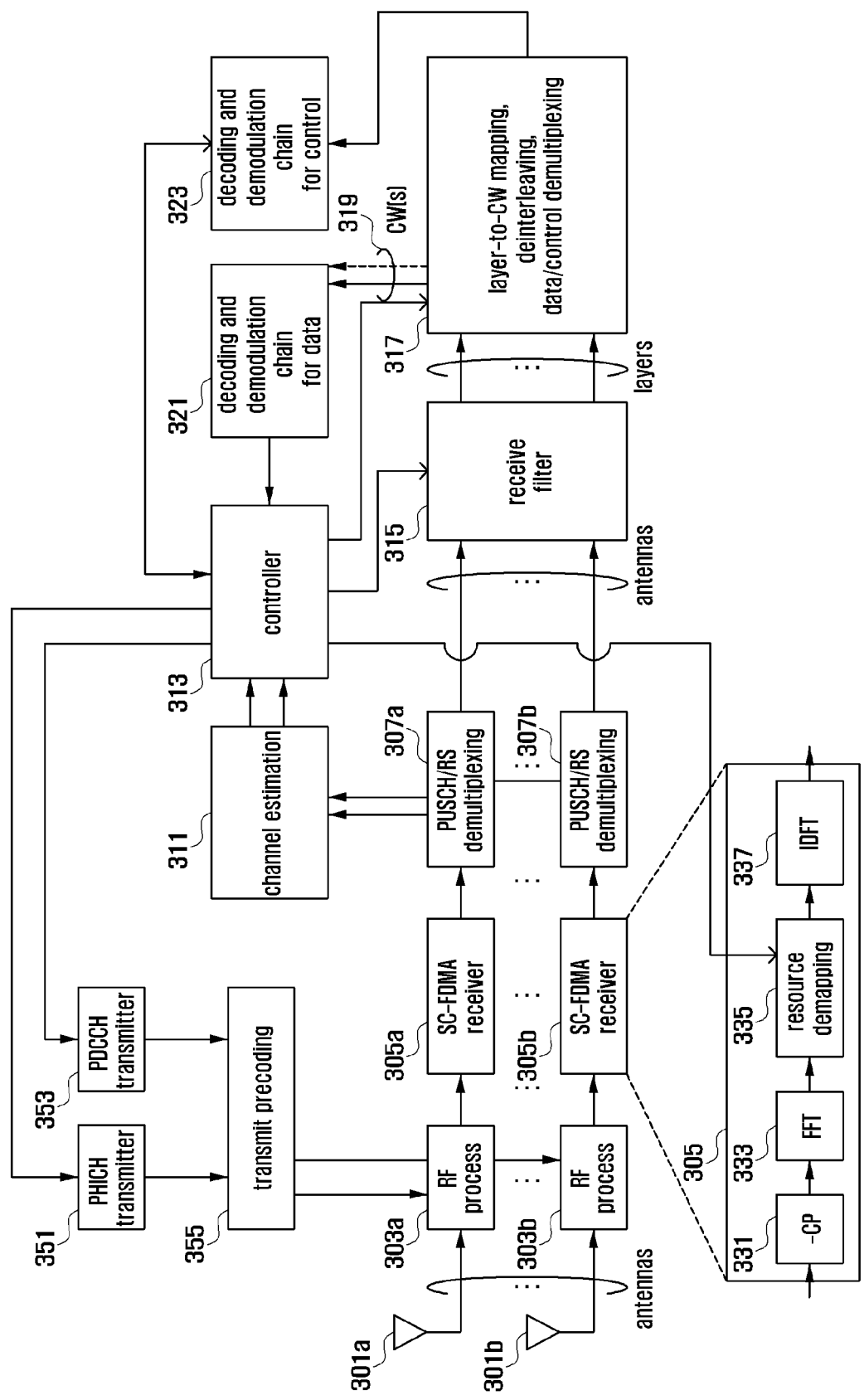
FIG. 6 is a block diagram illustrating a configuration of the eNB for supporting the UL MIMO, according to an embodiment of the present invention.

FIG. 6 is a block diagram illustrating a configuration of the eNB for supporting the UL MIMO, according to an embodiment of the present invention.

Referring to FIG. 6, 301a denotes a first receive antenna of the eNB, and 301b denotes a last receive antenna of the eNB. The signals received by a plurality of receive antennas of the eNB are converted to baseband signals by RF processors 303a to 303b. 303a denotes a first RF processor for processing the signal received by the first receive antenna 301a, and 303b denotes a last RF processor for processing the signal received by the last receive antenna 301b. The baseband signals converted from the signals received by the receive antennas are recovered into modulation symbol streams by SC-FDMA receivers 305a to 305b. 305a denotes a first SC-FDMA receiver for processing the signal received by the first receive antenna 301a, and 305b denotes a last SC-FDMA receiver for processing the signal received by the last receive antenna 301b.

Each of the SC-FDMA receivers 305a to 305b includes a CP remover 331, a Fast Fourier Transform (FFT) 333, a resource demapper 335, and an IDFT 337, and performs an operation that is inverse that of the SC-FDMA signal converter 211 of FIG. 5.

The signal output by an SC-FDMA receiver is the PUSCH and RS transmitted by a specific UE. Since the PUSCH and RS are multiplexed in time domain, each of demultiplexers 307a to 307b separates the PUSCH and RS of corresponding UE. 307a denotes a first demultiplexer for processing the signal received by the first receive antenna 301a, and 307b denotes a last demultiplexer for processing the signal received by the last receive antenna 301b. The RSs demultiplexed from the receive signals are transferred to a channel estimator 311, and the PUSCH signals demultiplexed from the receive signals are transferred to a MIMO receive filter 315.

The channel estimator 311 estimates an uplink channel using the received RSs and transfers the estimation results to a controller 313 such that the controller 313 calculates an appropriate receive filter coefficient. The receive filter coefficient is transferred to a MIMO receive filter 315. The MIMO receive filter performs an operation that is inverse that of the precoder 209 of FIG. 5 so as to separate the per-layer PUSCH signals. The MIMO receive filter can be embodied as a Minimum Mean Square Error (MMSE) receive filter.

The per-layer receive signals are converted to the CW modulation signal streams and UCI modulation signal streams. Function block 317 performs steps that are inverse those of the function block 207 of FIG. 5 so as to include combining the layer signals per CW, interleaving the per-CW signals, and demultiplexing data and UCI. Since the process is performed based on the control information received from the UE in advance, the controller 313 having the control information controls the operations in the process.

Per-CW modulation signals 319 output by the function block 317 are transferred to a data demodulation and decoding block 321 and the UCI modulation signal is transferred to the UCI demodulation and decoding block 323. The base station receives the data successfully and performs UL and DL scheduling and AMC based on the UCI information.

The DCI of the grant for PUSCH transmission in UL MIMO further includes the following IEs.
  PMI: An IE that notifies of a precoding scheme using UL MIMO transmission
  Modulation and coding scheme for second TB: up to 2 TBs can be transmitted in UL MIMO. Accordingly, it is necessary to define the IE notifying of the modulation and coding scheme for the second TB.
  NDI for second TB: NDI can be defined per TB or for both the two TBs in UL MIMO. Although embodiments of the present invention are directed to the case where the TB is defined per NDI, additional embodiments of the present invention can be applied to the case where one NDI is defined for two TBs.

The eNB transmits PHICH and PDCCH for supporting a UL HARQ operation. A PHICH transmitter 351 transmits an ACK/NACK signal, and a PUSCH transmitter 353 transmits a DCI signal including a PUSCH grant. After being precoded by a transmit precoder 355, the PDCCH and PHICH signals are transferred to a plurality of transmit antennas. The controller 313 determines the transmission signal and resource, and controls the PDCCH transmitter 353 and PHICH transmitter 351.

Figure 1:
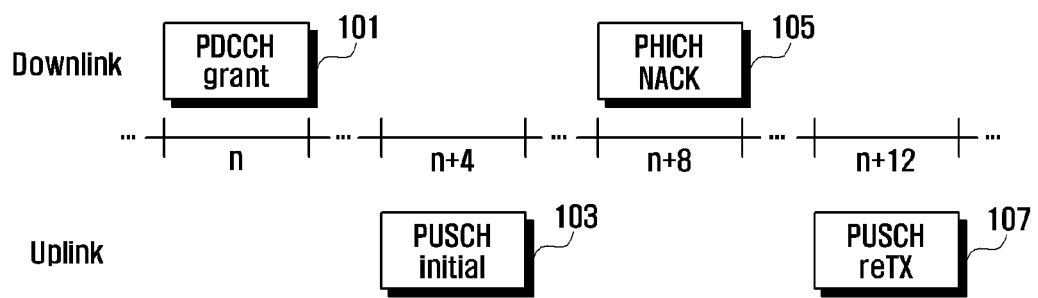
FIG. 1 is a diagram illustrating a UL synchronous HARQ process.
Figure 2:
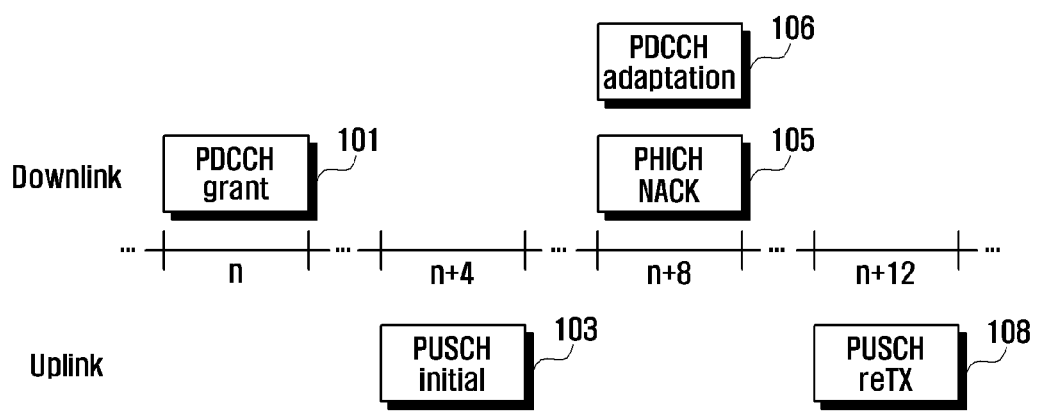
FIG. 2 is a diagram illustrating a UL adaptive synchronous HARQ process.
Figure 3:
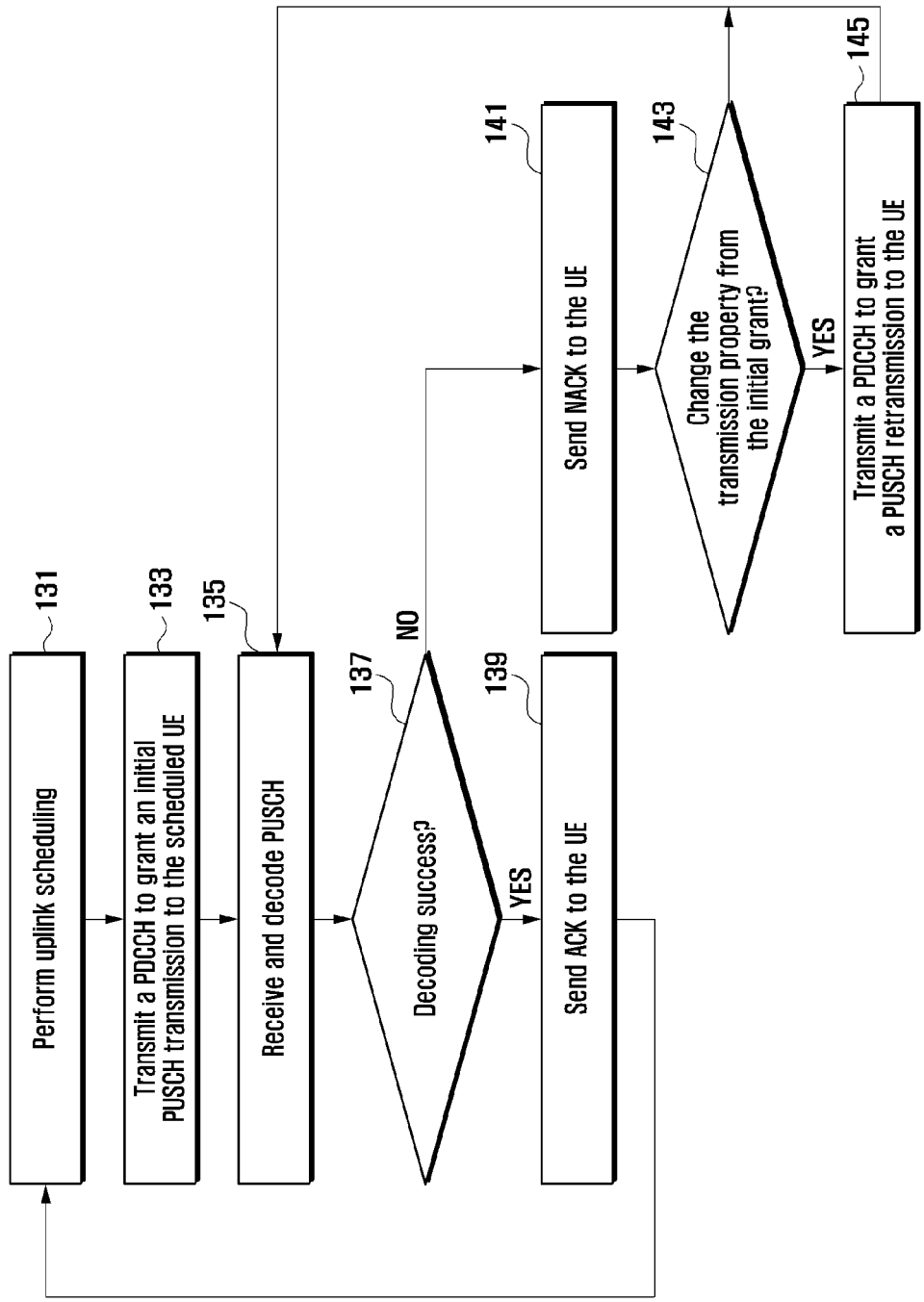
FIG. 3 is a flowchart illustrating operations of the eNB for the UL adaptive synchronization HARQ procedure.
Figure 4:
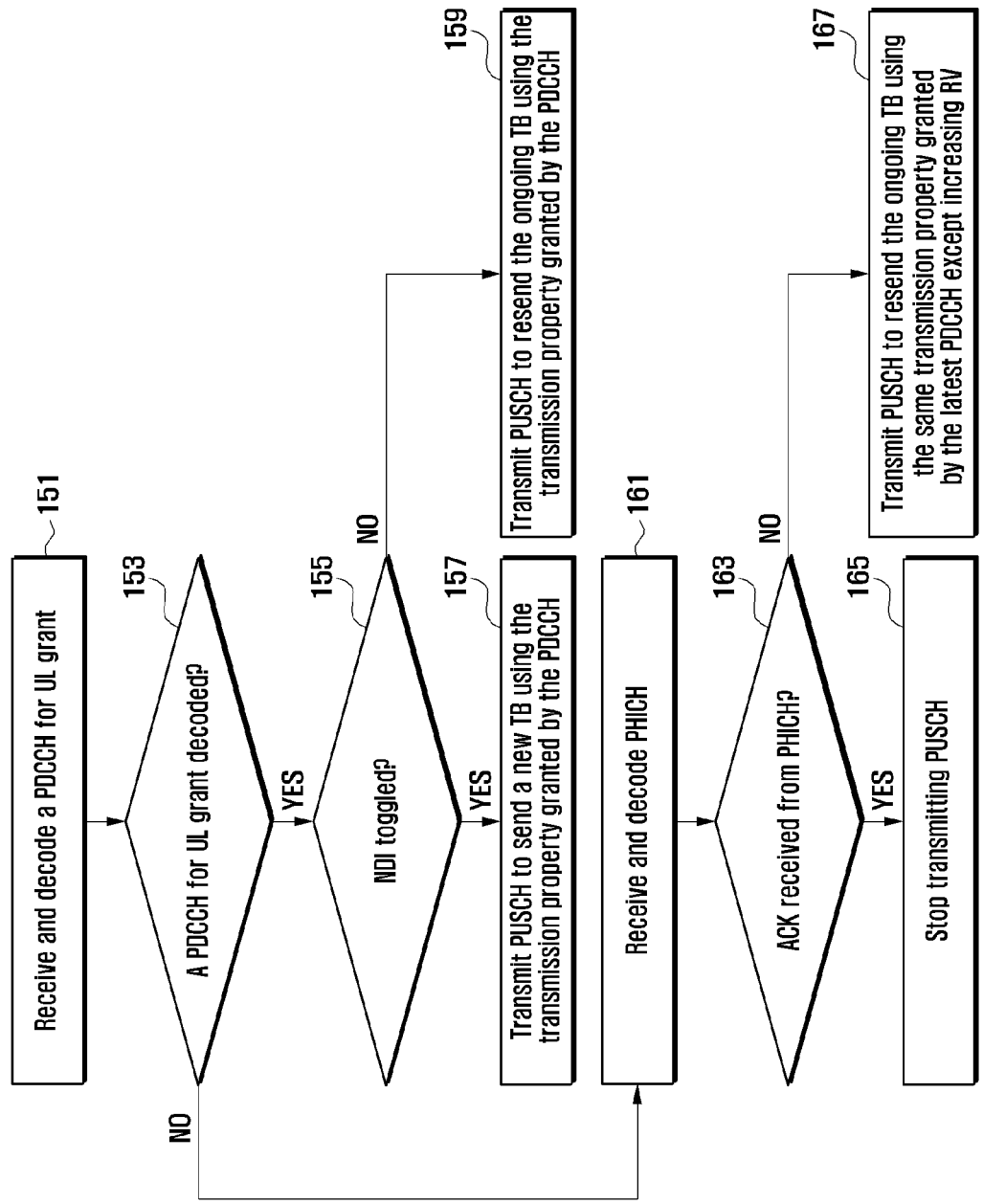
FIG. 4 is a flowchart illustrating operations of the UE for the UL adaptive HARQ procedure.
Figure 7:
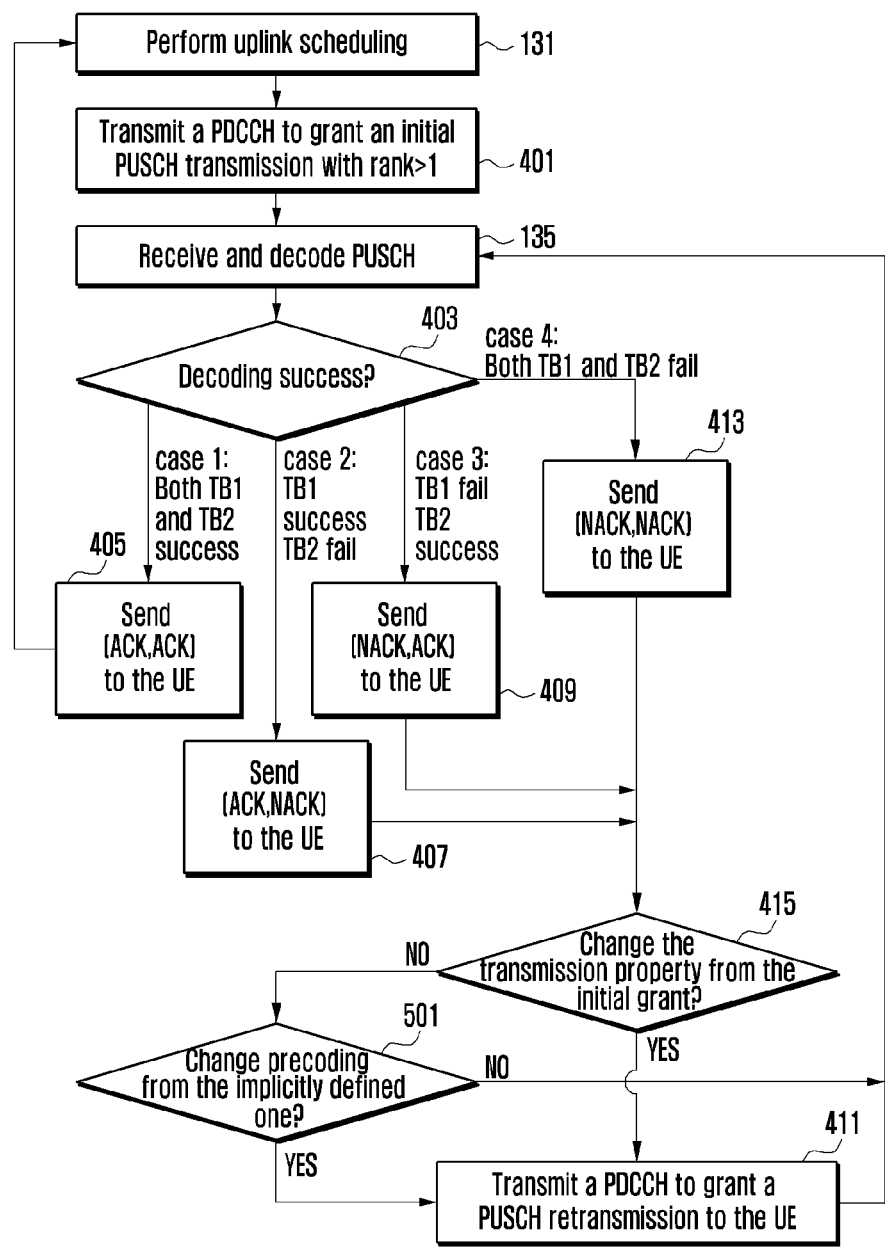
FIG. 7 is a flowchart illustrating a procedure of the eNB for supporting UL MIMO, according to an embodiment of the present invention.

FIG. 7 is a flowchart illustrating a procedure of the eNB for supporting UL MIMO, according to an embodiment of the present invention. The procedure of FIG. 7 shows the operations of the controller 313 of FIG. 6 that are related to the UL MIMO. The PUSCH grant for transmitting one TB is similar to the procedure of FIG. 3.

Referring to FIG. 7, the eNB performs UL scheduling to determine the resource for PUSCH grant to a certain UE, in step 131. The eNB transmits PDCCH carrying the PUSCH grant information to the scheduled UE, in step 401. Assuming the UL MIMO transmission, the rank-2 or higher ranks is informed to the UE. Specifically, it is assumed that two TB transmissions are granted. In the fourth subframe after the subframe in which the PDCCH has been transmitted, the eNB performs demodulation and decoding on PUSCH, in step 135. The eNB determines whether the PUSCH is decoded successfully, in step 403. Since the two TBs are transmitted, the determination result can be one of the following cases.
  Case 1: TB1 and TB2 are successfully decoded such that the eNB transmit PHICH carrying ACK/NACK, in step 405, and the methodology proceeds to step 131.
  Case 2: TB1 is successfully decoded but TB2 isn't such that the eNB transmits PHICH carrying ACK/NACK, in step 407, and the methodology proceeds to step 415.
  Case 3: TB2 is successfully decoded but TB2 isn't such that the eNB transmits PHICH carrying ACK/NACK, in step 409, and the methodology proceeds to step 415.
  Case 4: Decoding fails for both TB1 and TB2 such that the eNB transmits PHICH carrying ACK/NACK, in step 413, and the methodology proceeds to step 415.

In step 415, the eNB determines whether to change the transmission property as compared to the transmission property of the initial transmission of step 401. If it is determined to change the transmission property, the methodology proceeds to step 411 and, otherwise, the eNB receives the PUSCH under the assumption of retransmission of the UE without changing the transmission property of the initial transmission and the methodology proceeds to step 135.

In step 411, the eNB transmits the PDCCH notifying the UE of the transmission property to be used in retransmission. Under the assumption that that the PUSCH is transmitted using the transmission property which is newly notified by the eNB, the UE receives and decodes the PUSCH and the methodology proceeds to step 135.

Although it is possible to request the PUSCH retransmission by transmitting only the PHICH without PDCCH transmission in the first and fourth cases, it is necessary to transmit PDCCH informing of the transmission property for PUSCH retransmission in the second and third cases in which one of the two TBs is decoded successfully.

As summarized in Table 1, a number of TBs to be transmitted is determined depending on the value of the rank. If one of the two TBs transmitted in initial transmission is successfully decoded, there is no need to transmit the successfully decoded TB such that one TB is sent in the retransmission. As the number of TBs decreases, the value of the rank also decreases in the retransmission as compared to the initial transmission.

As shown in Tables 2 and 3, the precoder is defined differently depending on the rank. Accordingly, the precoder used in the initial transmission cannot be used for retransmission. In the PUSCH transmission based on the information of PDCCH, the scrambling sequence per TB and CS and OCC to be applied to the UL RS and the PHICH resource per TB are explicit. However, if the number of TBs decreases in PUSCH transmission based on the PHICH information, the scrambling sequence per TB and CS and OCC to be applied to the UL RS and the PHICH resource for checking ACK/NACK response of the eNB become unclear.

Figure 8:
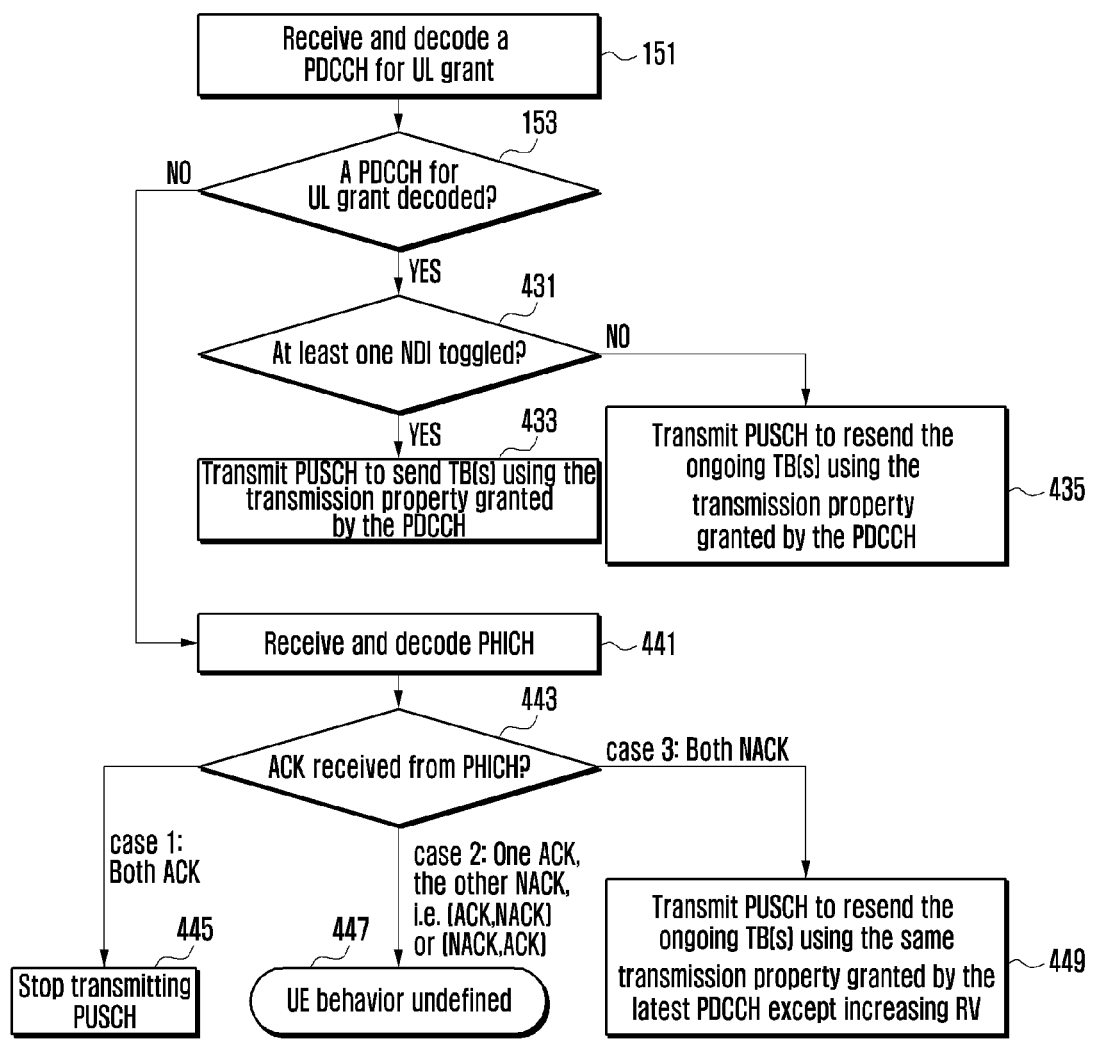
FIG. 8 is a flowchart illustrating a procedure of the UE for supporting normal UL MIMO, according to an embodiment of the present invention.

FIG. 8 is a flowchart illustrating a procedure of the UE for supporting UL MIMO, according to an embodiment of the present invention.

Referring to FIG. 8, the UE receives PDCCH for UL grant and attempts decoding the PDCCH, in step 151. The UE determines whether decoding is successful, in step 153. If the PDCCH for UL grant is decoded successfully, the UE determines whether at least one NDI is toggled, in step 431. Assuming the UL MIMO transmission, the initial grant has the information on the two TBs. Assuming that NDI is defined per TB, if both of the two NDIs are not toggled, this means that the UL grant is a request for retransmission, and thus, the UE retransmits the PUSCH with a new transmission property including a PMI, in step 435. If at least one of the NDIs is toggled, the methodology proceeds to step 433 where the TB corresponding to the toggled NDI is of an initial transmission and the TB corresponding to non-toggled NDI is of a retransmission. Regardless of whether the TB is set in initial transmission or retransmission, the transmission property including PMI follows the value indicated in the corresponding PDCCH. Although only one NDI is defined regardless of the number of TBs, if the NDI is not toggled, the methodology proceeds to step 433 for initial transmission of a new TB and, otherwise if the NDI is toggled, the methodology proceeds to step 435 for retransmission. In terms of precoding, if PDCCH is received, the UE transmits the precoded PUSCH reflecting the PMI indicated by the PDCCH regardless of the retransmission of TB.

If no PDCCH is received, the UE receives PHICH and attempts decoding the PHICH, in step 441. In step 443, it is determined if an ACK is received from the PHICH. Assuming that the PHICH has the ACK/NACK information related to the TBs, three cases are possible. Case 1 is that ACKs are received for both of the two TBs such that the UE transmits no PUSCH, in step 445. Case 2 is that an ACK is received for one TB and a NACK for the other TB. In this case, the number of TBs to be retransmitted decreases such that it is inevitable to change the value of the rank. However, since the eNB has not notified of PMI, it is unclear which precoding scheme is applied for PUSCH transmission. Accordingly, it is impossible to define the PUSCH transmission operation of the corresponding UE in step 447. Case 3 is that NACKs are received for both of the two TBs such that it is necessary to send the two TBs in retransmission. In this case, there is no change in rank and no notification of PMI by eNB, the UE retransmits the PUSCH using the transmission property including PMI indicated in the most recently received UL grant. However, the RV should be changed for retransmission according to the rule of the IR-based synchronous HARQ.

Embodiments of the present invention provide the following for defining operations of the eNB and UE in a situation where the UL HARQ retransmission is requested only with PHICH in the LTE system supporting UL MIMO.

Scrambling sequence of the TB in retransmission
Parameter of UL RS for retransmission, CS and OCC
PHICH resource corresponding to the TB in retransmission Specifically, the UE supports the UL MIMO according to an embodiment of the present invention. The UE transmits a plurality of TBs to the eNB. The UE transmits the TBs using the UL RS parameters corresponding to the respective TBs. When the eNB does not receive one of the TBs, the UE configures the CW of the lost TB. If the PHICHs corresponding to the TBs are received from the eNB, the UE determines whether each TB is received successfully based on the PHICHs. The UE also determines the property parameter corresponding to the configured CW. The UE also retransmits the lost TB to the eNB according to the determined property parameter.

The UE determines the property parameter independently. Specifically, the UE determines the scrambling sequence corresponding to the configured CW. The UE selects one of the previously used UL RS parameters for retransmission of the mission TB. The UE can determine the offset value for CS and the offset value for OCC according the determined UL RS parameter. The UE also determines the PHICH resource for observing whether the retransmitted TB is received successfully.

The eNB also supports the UL MIMO according to embodiments of the present invention. The eNB receives a plurality of TBs and sends the UE a response indicating whether the individual TBs are received successfully. The eNB transmits the response per TB on the PHICH. If one of the TBs is lost, the eNB configures the CW of the lost TB and determines the property parameter corresponding to the configured CW. The eNB receives the lost TB that is retransmitted according to the determined property parameter, and sends the response indicating whether the retransmission of the lost TB is successful. The eNB transmits the response through the PHICH.

The eNB determines the property parameter independently. The eNB does not provide the UE with the property parameter. Specifically, the eNB determines the scrambling sequence corresponding to the configured CW. The eNB also selects one of the previously used UL RS parameters that matches the lost TB. The eNB can determine the offset values of the CS and OCC according to the determined UL RS parameter. The eNB also determines the PHICH resource for transmitting information on whether the retransmission of the lost TB is successful.

The transceivers of the UE and eNB are configured as shown in FIGS. 5 and 6, respectively. According to an embodiment of the present invention, the configurations of the controller 241 of FIG. 5 and the controller 313 of FIG. 6 should be modified.

The controller 241 of the UE is provided with a judgment unit, a configuration unit, and a determination unit. The controller 241 transmits a plurality TBs to the eNB by the RF processors 215*a*-215*b* and then detects the receipt of the PHICH from the eNB by the PHICH receiver 255. The judgment unit judges whether each TB is successfully received. If one of the TBs is lost, the judgment unit notifies the configuration unit of the lost TB. The configuration unit reconfigures the codeword of the lost TB. The determination unit determines the property parameter corresponding to the configured codeword. In this manner, the controller 241 retransmits the lost TB to the eNB according to the determined property parameter.

The controller 241 transmits two TBs to the eNB. The controller 241 transmits the TBs according to the property parameters received from the eNB. The property parameters include the number of layers and precoding indices of the individual TBs. If it is detected that one of the two TBs are not received by the eNB, the controller 241 sets the precoding index for retransmitting the lost TB to a predetermined value. The controller 241 can set the precoding index to 0. The controller 241 maintains the number of layers. The controller 241 also retransmits the lost TB using the corresponding precoding index. Otherwise, if it is determined that both the two TBs are not received by the eNB, the controller 241 maintains the property parameters and retransmits the lost TBs using the property parameters.

The controller 313 of the eNB is provided with a configuration unit and a determination unit. Specifically, the controller 313 receives a plurality of TBs from the UE by the RF processors 303a-303b and sends the eNB the PHICH indicating whether each of the TBs is received successfully. If one of the TBs is not received, the configuration unit configures the CW of the lost TB. The determination unit determines the property parameter corresponding to the configured CW. In this manner, the controller 313 controls reception of the lost TB from the UE by the RF processors 303a-303b and sends the UE the PHICH indication, indicating whether the retransmission of the lost TB is successful.

The controller 313 performs scheduling to allocate resources for receiving the TBs transmitted by the UE. The controller 313 determines the property parameters and sends the property parameters to the UE. Afterward, the controller 313 attempts to receive the lost TBs according to the property parameters. The property parameters include the number of layers and precoding indices for the TBs. If one of the two TBs is not received, the controller 313 sends a response signal for the lost TB. The controller 313 also sets the precoding index of the lost TB to a predetermined value. The controller 313 can set the precoding index to 0. The controller 313 maintains the number of layers. Afterward, the controller 131 receives the retransmitted TB according to the corresponding precoding index. If both of the two TBs are not received, the controller 313 maintains the property parameters and receives the TBs according to the property parameters.

In an embodiment of the present invention, when the PHICH indicates retransmission of one of the two TBs of the initial transmission, the retransmitted TB is regarded as CW0 regardless of the sequence number of the retransmitted TB.

Table 5 summarizes scrambling, UL RS, and PHICH determined according to this embodiment of the present invention.

Figure 9:
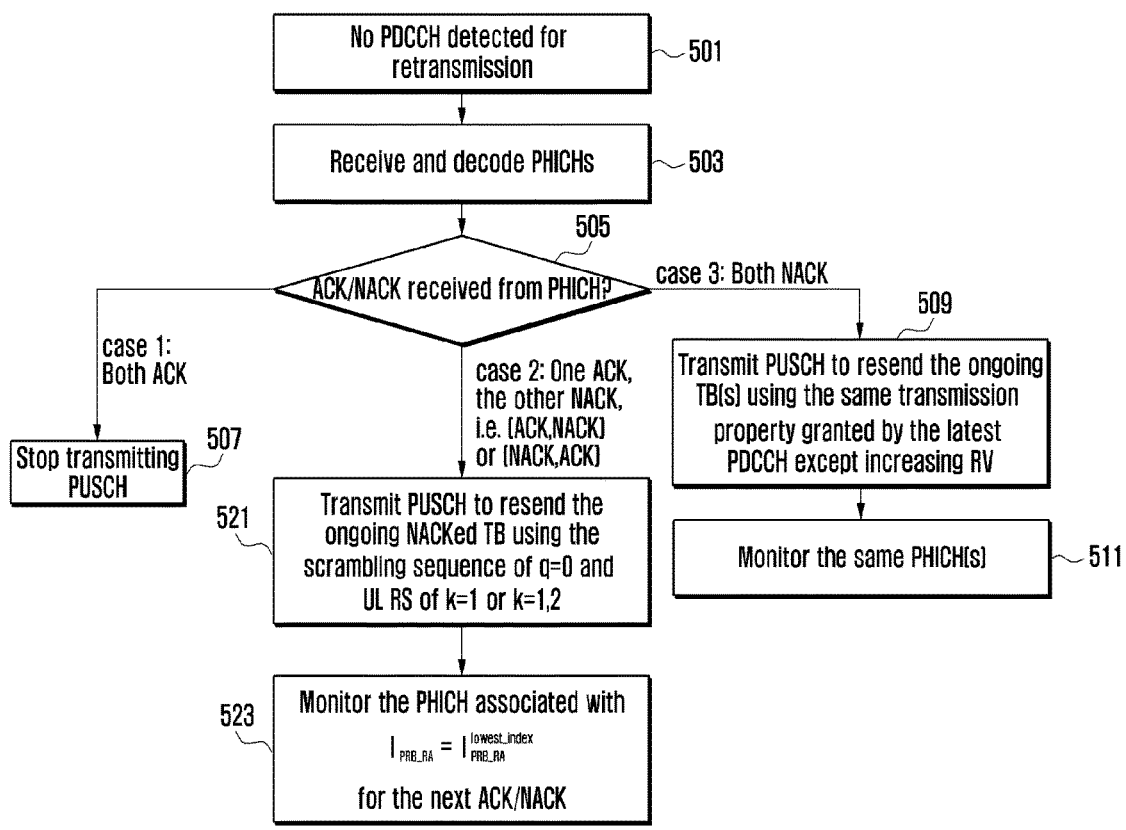
FIG. 9 is a flowchart illustrating operations of the UE supporting UL MIMO, according to an embodiment of the present invention.

Referring to FIG. 9, the UE is in a state in which no PDCCH, for PUSCH retransmission caused by the reception failure of the two TBs in the previous transmission, is received in step 501. The UE receives and decodes the PHICHs, in step 503. Specifically, the UE is about to transmit the PUSCH based on the information carried in PHICHs. The UE determines whether the PHICH includes an ACK/NACK, in step 505. When ACKs are received for the two TBs (case 1), the UE stops the PUSCH retransmission, in step 507. When NACKs are received for the two TBs (case 3), the UE retransmits the two TBs in the same transmission rule, in step 509, and monitors the same PHICH(s) to detect the receipt of the ACK/NACK for the retransmitted TBs, in step 511. When an ACK is received for one of the two TBs and a NACK is received for the other of the two TBs (case 2), the UE regards the TB as retransmitted as CW0, retransmits the corresponding TB using the scrambling sequence acquired by applying q=0 to Equation (2) and the UL RS for the first layer or the first and second layers, which is obtained using the first layer UL RS parameter indicated in the most recently received PDCCH, in step 521. The UE monitors to detect receipt of the PHICH on the PHICH resource determined by applying $I_{PRB\_RA}=I_{PRB\_RA}^{lowest\_index}$ to Equation (5) to receive ACK/NACK for the retransmitted TB, in step 523.

When generating the UL RS for the first layer or the first and second layers, in step 521, the UE generates the UL RS (k=1) for the first layer when the retransmitted TB has occupied one layer in the previous PUSCH transmission, and generates the UL RS (k=1, 2) for the first and second layers when the retransmitted TB has occupied two layers in the previous PUSCH transmission.

Figure 10:
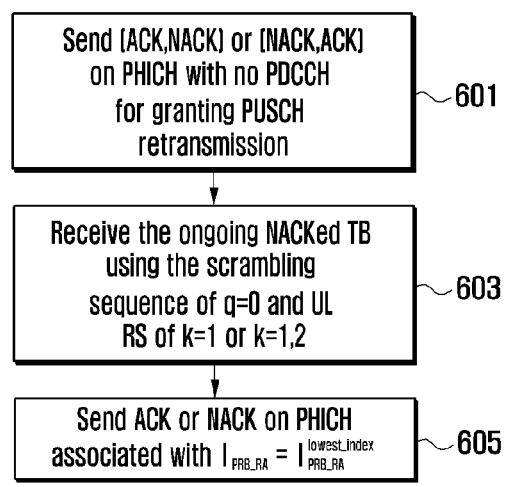
FIG. 10 is a flowchart illustrating operations of the eNB supporting UL MIMO, according to an embodiment of the present invention.

FIG. 10 is a flowchart illustrating operations of the eNB supporting UL MIMO, according to an embodiment of the present invention.

Referring to FIG. 10, when one of the two TBs received in the previous transmission of the UE is decoded successfully but the other has failed to decode, the eNB sends

TABLE 5

| Item | (NACK, NACK) | (NACK, ACK) | (ACK, NACK) | (ACK, ACK) |
|---|---|---|---|---|
| Scrambling | Use previous transmission rule | Use q = 0 in equation (2) | | Retransmission is not necessary |
| UL RS | | Use k = 1 or k = 1, 2 in equation (4)* | | |
| PHICH | | Use $I_{PRB\_RA} = I_{PRB\_RA}^{lowest\_index}$ in equation (5) | | | k=1 is used for a TB in a single layer retransmission, and k=1 is used for the TB on the first layer and k=2 is used for the TB on the second layer in a dual layer retransmission.

According to this embodiment of the present invention, the CW sequence is reconfigured regardless of the CW corresponding to the TB in the previous transmission. The scrambling, UL RS, and PHICH are determined according to the reconfigured CW sequence.

FIG. 9 is a flowchart illustrating operations of the UE supporting UL MIMO, according to an embodiment of the present invention.

(ACK, NACK) or (NACK, ACK) on the PHICH with no PDCCH, in step 601. The eNB regards the TB as retransmitted as CW0, and receives the corresponding TB using the scrambling sequence obtained by applying q=0 to Equation (2) and the UL RS for the first layer or the first and second layers, in step 603. The eNB sends the ACK/NACK for the retransmitted TB on the PHICH resource determined by applying $I_{PRB\_RA}=I_{PRB\_RA}^{lowest\_index}$ to Equation (5), in step 605.

In the embodiment of the present invention described above, scrambling, the UL RS, and the PHICH are determined according to the index number of the TB to be retransmitted as shown in Table 6.

TABLE 6

| Item | (NACK, NACK) | (NACK, ACK) | (ACK, NACK) | (ACK, ACK) |
|---|---|---|---|---|
| Scrambling | Use previous transmission rule | Use q = 0 in equation (2) | Apply q = 1 to equation (2) | Retransmission is not necessary |
| UL RS | | Reuse UL RS parameter used for TB1 in previous transmission | Reuse UL RS parameter used for TB2 in previous transmission | |
| PHICH | | Apply $I_{PRB\_RA} = I_{PRB\_RA}^{lowest\_index}$ to equation (5) | Apply $I_{PRB\_RA} = I_{PRB\_RA}^{lowest\_index} + 1$ to equation (5) | |

According to another embodiment of the present invention, the TB to be retransmitted maintains the CW sequence assigned in the previous transmission. The second embodiment is advantageous in that the eNB can receive the TB retransmitted in response to the normally received NACK even when it has failed to receive one of the ACK/NACK signals transmitted by the UE. Assuming that the UE misinterprets the (ACK, NACK) signal transmitted by the eNB for retransmission of TB2 as (NACK, NACK) signal, as a consequence, the UE retransmits both the TB1 and TB2. According to the embodiment of the present invention described above, the eNB attempts to receive TB2 corresponding to CW0 but the UE retransmits TB1 corresponding to CW0 and TB2 corresponding to CW1. Since the scrambling sequence and the UL RS for the TBs are interpreted differently by the eNB and the UE, the eNB cannot receive any of the retransmitted TBs in that the operation is not defined in consideration of such a situation. In this embodiment of the present invention, the eNB attempts to receive the TB2 corresponding to CW1, while the UE transmits both the TB1 corresponding to CW0 and the TB2 corresponding to CW1. Although it is impossible to receive the TB1 corresponding to CW0, the eNB can receive the TB2 corresponding to CW1 normally. According to this embodiment of the present invention, the eNB can receive the retransmitted TB2 in an erroneous situation without an additional process for the erroneous situation.

In order to support this embodiment of the present invention, it is necessary to define CW-layer mapping for retransmission of only the CW1 as shown below in Table 7.

TABLE 7

| Mapping | # of layers (rank) | # of CWs | CW-to-layer mapping |
|---|---|---|---|
| 1 | 1 | 1 | CW 0 → layer 0: $x^{(0)}(i) = d^{(0)}(i)$ |
| 2 | 1 | 1 | CW 1 → layer 0: $x^{(0)}(i) = d^{(1)}(i)$ |
| 3 | 2 | 2 | CW 0 → layer 0 & CW 1 → layer 1: $x^{(0)}(i) = d^{(0)}(i)$ $x^{(1)}(i) = d^{(1)}(i)$ |
| 4 | 2 | 1 | CW 0 → layers {0, 1}: $x^{(0)}(i) = d^{(0)}(2i)$ $x^{(1)}(i) = d^{(0)}(2i + 1)$ only retransmission is allowed |
| 5 | 2 | 1 | CW 1 → layers {0, 1}: $x^{(0)}(i) = d^{(1)}(2i)$ $x^{(1)}(i) = d^{(1)}(2i + 1)$ only retransmission is allowed |
| 6 | 3 | 2 | CW 0 → layer 0 & CW 1 → layers {1, 2}: $x^{(0)}(i) = d^{(0)}(i)$ $x^{(1)}(i) = d^{(1)}(2i)$ $x^{(2)}(i) = d^{(1)}(2i + 1)$ |
| 7 | 4 | 2 | CW 0 → layer {0, 1} & CW 1 → layers {2, 3}: $x^{(0)}(i) = d^{(0)}(i)$ $x^{(1)}(i) = d^{(1)}(2i)$ $x^{(2)}(i) = d^{(1)}(2i + 1)$ |

In comparison with Table 1, Table 7 further includes mapping 2 and mapping 5.

Figure 11:
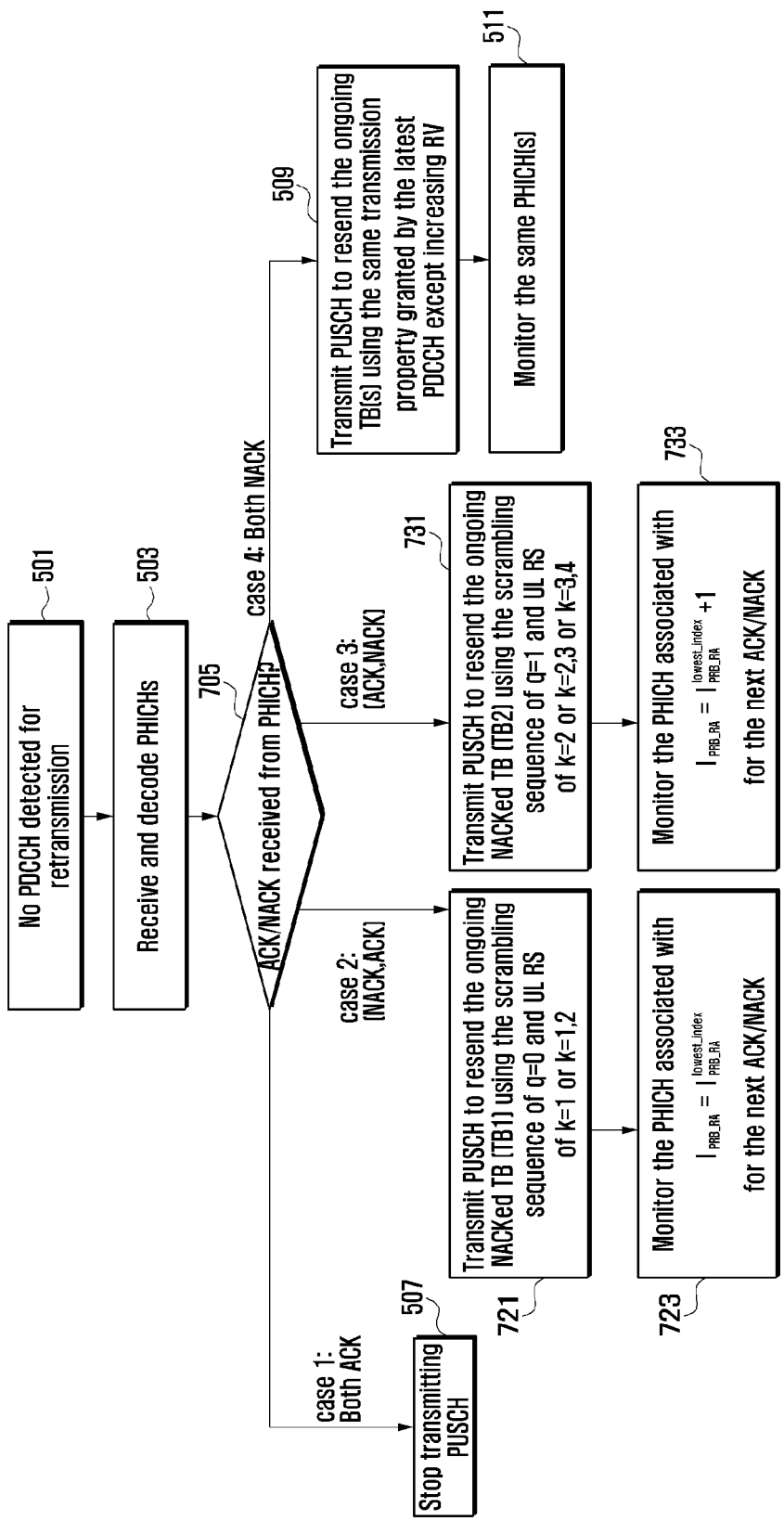
FIG. 11 is a flowchart illustrating operations of the UE supporting UL MIMO, according to an embodiment of the present invention.

FIG. 11 is a flowchart illustrating operations of the UE supporting UL MIMO, according to an embodiment of the present invention.

Referring to FIG. 11, the UE is in a state in which no PDCCH is received for the PUSCH retransmission, after sending two TBs in the previous transmission, in step 501. The UE receives PHICHs, in step 503. Specifically, the UE is about to retransmit the PUSCH based on the information of the PHICH. Upon receipt of the PHICHs, the UE checks the ACK/NACK of the PHICH, in step 705. If the PHICH carries ACKs for both respective TBs (case 1), the UE stops retransmission of PUSCH, in step 507. If the PHICH carriers NACKs for both respective TBs (case 3), the UE retransmits the two TBs using the previous transmission rule, in step 509, and monitors the same PHICHs to detect the receipt of ACK/NACK for the retransmitted TBs, in step 511.

If the PHICH carries a NACK and an ACK for TB1 and TB2, respectively, such that it is necessary to retransmit only the TB1 (case 2), the UE regards the TB to be retransmitted as CW0, and the corresponding TB is transmitted using the scrambling sequence obtained by applying q=0 to Equation (2) and the first layer UL RS or the first and second layers UL RS obtained using the UL RS parameter of the first layer, which is indicated in the most recently received PDCCH, in step 721. The UE monitors the PHICH associated with $I_{PRB\_RA} = I_{PRB\_RA}^{lowest\_index}$ applied to Equation (5) for receiving ACK/NACK for the retransmitted TB, in step 723.

In step 721, the UE reuses the same first layer UL RS when the UL RS (k=1) has been used for TB1 in the previous PUSCH transmission, and the same first and second layers UL RS when the UL RS (k=1, 2) has been used for TB1 in the previous PUSCH transmission.

If the PHICH carries an ACK and a NACK for TB1 and TB2, respectively, such that it is necessary to retransmit only the TB2 (case 3), the UE regards the TB to be transmitted as CW1, and the corresponding TB is retransmitted using the scrambling sequence obtained by applying q=1 to Equation (2) and the second layer UL RS or the second and third layers UL RS or the third and fourth layers UL RS obtained by applying the UL RS parameter of the first layer, which is indicated in the most recently received PDCCH, in step 731. In order to receive the ACK/NACK for the retransmitted TB, the UE monitors PHICH associated with $I_{PRB\_RA}=I_{PRB\_RA}^{lowest\_index}+1$ applied to Equation (5), in step 733. In step 731, the UE reuses the same UL RS when the second layer UL RS (k=2) has been used for TB 2 in the previous PUSCH transmission, the same UL RS when the second and third layers UL RS (k=2, 3) has been used for TB2 in the previous PUSCH transmission, and the same UL RS when third and fourth layers UL RS (k=3, 4) has been used for TB2 in the previous PUSCH transmission.

Figure 12:
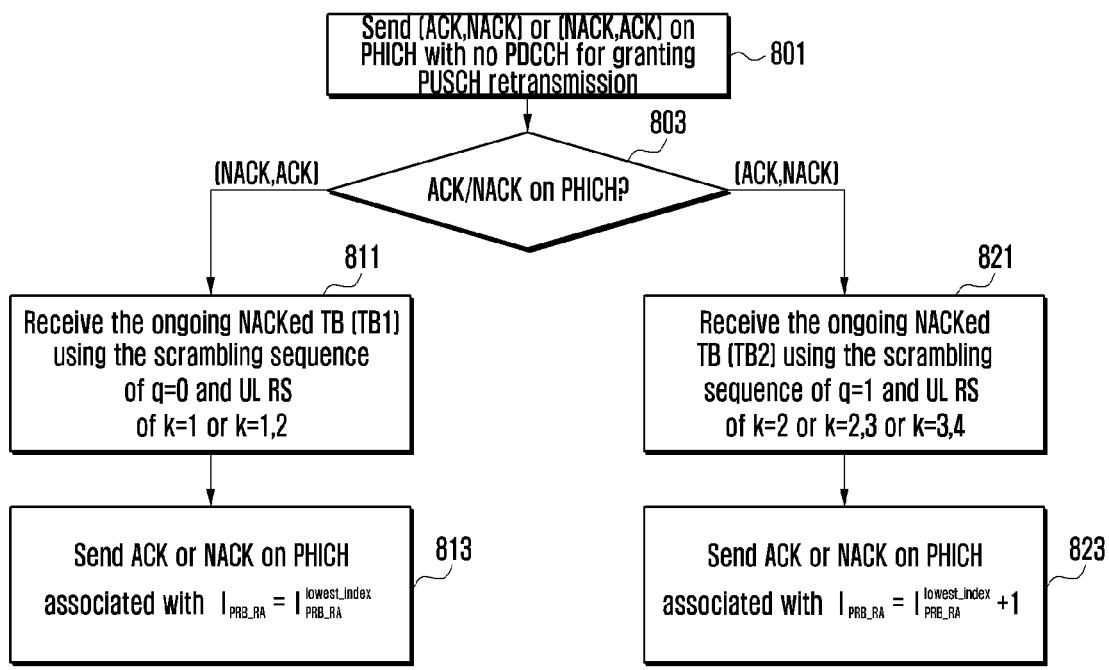
FIG. 12 is a flowchart illustrating operations of the eNB supporting UL MIMO, according to an embodiment of the present invention.

FIG. 12 is a flowchart illustrating operations of the eNB supporting UL MIMO, according to an embodiment of the present invention.

Referring to FIG. 12, the eNB is in a state in which one of the two TBs received in the previous transmission of the UE is decoded successfully, but the other has failed in decoding, such that the eNB transmits an (ACK, NACK) signal or an (NACK, ACK) signal to the UE on the PHICH with no PDCCH for granting PUSCH retransmission, in step 801. The eNB determines whether ACK or NACK for each of the TBs has been transmitted, in step 803. If it is determined that the (NACK, ACK) signal has been transmitted (i.e., a request for retransmission of TB1 has been transmitted), the eNB receives the corresponding TB using the scrambling sequence of q=0 applied to Equation (2) and the UL RS for the first layer or the first and second layers, in step 811. The eNB transmits the ACK/NACK for the retransmitted TB1 on the PHICH associated with $I_{PRB\_RA}=I_{PRB\_RA}^{lowest\_index}$ applied to Equation (5), in step 813. If it is determined that the (ACK, NACK) signal has been transmitted (i.e., a request for retransmission of TB2 has been transmitted), the eNB receives the corresponding TB using the scrambling sequence of q=1 applied to Equation (2) and the UL RS for the second layer UL RS, the second and third layers UL RS, or the third and fourth layers UL RS, in step 821. The eNB transmits the ACK/NACK for the retransmitted TB2 on the PHICH associated with $I_{PRB\_RA}=I_{PRB\_RA}^{lowest\_index}+1$ applied to Equation (5), in step 823.

The UE and the eNB of the LTE system supporting UL MIMO, according to embodiments of the present invention, determine property parameters for UL retransmission independently. As a consequence, it is possible to perform the UL HARQ with no signal exchange for the property parameters. Thus, the UL HARQ between the UE and the eNB can be implemented only with the PHICH, resulting in improved efficiency of UL HARQ in the LTE system.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method by a terminal, the method comprising:
transmitting, by a transceiver, two transport blocks; and
if one of the two transport blocks is negatively acknowledged (NACKed) and a physical downlink control channel (PDCCH) including control information is not detected, adjusting, by a controller, retransmission for the NACKed transport block using a precoding index 0 and a number of layers corresponding to the NACKed transport block.

2. The method of claim 1, wherein a physical hybrid automatic request (HARD) indicator channel (PHICH) resource corresponding to the retransmission for the NACKed transport block is based on the lowest physical resource block (PRB) index used for the transmission.

3. The method of claim 1, wherein the retransmission for the NACKed transport block is based on a reference signal (RS) determined according to an RS parameter in the most recent PDCCH and the number of layers corresponding to the NACKed transport block.

4. The method of claim 1, wherein a scrambling sequence determined based on a value corresponding to a single-codeword transmission is used for the retransmission for the NACKed transport block.

5. A method by a base station, the method comprising:
receiving, by a transceiver, two transport blocks; and
receiving, by the transceiver, retransmission for a negatively acknowledged (NACKed) transport block using a precoding index 0 and a number of layers corresponding to the NACKed transport block, if the base station transmits a NACK for one of the two transport blocks and does not transmit a physical downlink control channel (PDCCH) including control information.

6. The method of claim 5, wherein a physical hybrid automatic request (HARQ) indicator channel (PHICH) resource corresponding to the retransmission for the NACKed transport block is based on the lowest physical resource block (PRB) index.

7. The method of claim 5, wherein the retransmission for the NACKed transport block is based on a reference signal (RS) determined according to an RS parameter in the most recent PDCCH and the number of layers corresponding to the NACKed transport block.

8. The method of claim 5, wherein a scrambling sequence determined based on a value corresponding to a single-codeword transmission is used for the retransmission for the NACKed transport block.

9. A terminal, the terminal comprising:
a transceiver; and
a controller configured to:
transmit, via the transceiver, two transport blocks, and
if one of the two transport blocks is negatively acknowledged (NACKed) and a physical downlink control channel (PDCCH) including control information is not detected, adjust retransmission for the NACKed transport block using a precoding index 0 and a number of layers corresponding to the NACKed transport block.

10. The terminal of claim 9, wherein a physical hybrid automatic request (HARQ) indicator channel (PHICH) resource corresponding to the retransmission for the NACKed transport block is based on the lowest physical resource block (PRB) index used for the transmission.

11. The terminal of claim 9, wherein the retransmission for the NACKed transport block is based on a reference signal (RS) determined according to an RS parameter in the most recent PDCCH and the number of layers corresponding to the NACKed transport block.

12. The terminal of claim 9, wherein a scrambling sequence determined based on a value corresponding to a single-codeword transmission is used for the retransmission for the NACKed transport block.

13. A base station, the base station comprising:
a transceiver; and
a controller configured to:
receive, via the transceiver, two transport blocks; and
receive, via the transceiver, retransmission for a negatively acknowledged (NACKed) transport block using a precoding index 0 and a number of layers corresponding to the NACKed transport block, if the base station transmits a negative acknowledgment (NACK) for one of the two transport blocks and does not transmit a physical downlink control channel (PDCCH) including control information.

14. The base station of claim 13, wherein a physical hybrid automatic request (HARQ) indicator channel (PHICH) resource corresponding to the retransmission for the NACKed transport block is based on the lowest physical resource block (PRB) index.

15. The base station of claim 13, wherein the retransmission for the NACKed transport block is based on a reference signal (RS) determined according to an RS parameter in the most recent PDCCH and the number of layers corresponding to the NACKed transport block.

16. The base station of claim 13, wherein a scrambling sequence determined based on a value corresponding to a single-codeword transmission is used for the retransmission for the NACKed transport block.

\* \* \* \* \*